United States Patent
Ghetti

(10) Patent No.: US 9,619,659 B1
(45) Date of Patent: *Apr. 11, 2017

(54) SYSTEMS AND METHODS FOR PROVIDING INFORMATION SECURITY USING CONTEXT-BASED KEYS

(71) Applicant: Ionic Security, Inc., Atlanta, GA (US)

(72) Inventor: Adam Ghetti, Atlanta, GA (US)

(73) Assignee: Ionic Security Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/054,490

(22) Filed: Feb. 26, 2016

Related U.S. Application Data

(63) Continuation of application No. 14/843,504, filed on Sep. 2, 2015, which is a continuation of application No. 13/523,411, filed on Jun. 14, 2012, now Pat. No. 9,224,000.

(60) Provisional application No. 61/496,637, filed on Jun. 14, 2011.

(51) Int. Cl.
| | |
|---|---|
| G06F 21/60 | (2013.01) |
| G06F 21/62 | (2013.01) |
| H04L 9/08 | (2006.01) |

(52) U.S. Cl.
CPC ........ G06F 21/602 (2013.01); G06F 21/6209 (2013.01); H04L 9/083 (2013.01); H04L 9/0866 (2013.01)

(58) Field of Classification Search
CPC . G06F 21/602; G06F 21/6209; H04L 9/0866; H04L 9/083
See application file for complete search history.

(56) References Cited

U.S. PATENT DOCUMENTS

| | | | |
|---|---|---|---|
| 5,915,025 A | * | 6/1999 | Taguchi ............... G06F 12/145 380/44 |
| 5,963,646 A | | 10/1999 | Fielder et al. |
| 6,565,609 B1 | | 5/2003 | Sorge et al. |
| 6,904,521 B1 | | 6/2005 | Jivsov |

(Continued)

OTHER PUBLICATIONS

Constantino, et al., "Towards Enforcing On-The-Fly Policies in BYOD Environments", Information Assurance and Security (IAS), 2013 9th International Conference, IEEE, 2013.

*Primary Examiner* — Robert Leung
(74) *Attorney, Agent, or Firm* — Morris, Manning & Martin LLP; Daniel E. Sineway, Esq.; R. Lee Strasburger, Jr., Esq.

(57) ABSTRACT

Systems and methods for securing or encrypting data or other information arising from a user's interaction with software and/or hardware, resulting in transformation of original data into ciphertext. Generally, the ciphertext is generated using context-based keys that depend on the environment in which the original data originated and/or accessed. The ciphertext can be stored in a user's storage device or in an enterprise database (e.g., at-rest encryption), or shared with other users (e.g., cryptographic communication). Use of context-based encryption keys enables key association with individual data elements, as opposed to public-private key pairs, or use of conventional user-based or system-based keys. In scenarios wherein data is shared by a sender with other users, the system manages the rights of users who are able to send and/or access the sender's data according to pre-defined policies/roles.

10 Claims, 17 Drawing Sheets

EXEMPLARY SERVER MODULE (KAAP SERVER) PROCESS

(56) References Cited

U.S. PATENT DOCUMENTS

| | | | |
|---|---|---|---|
| 7,636,439 B2* | 12/2009 | Nakabayashi | H04L 9/0662 |
| | | | 380/44 |
| 8,495,709 B1 | 7/2013 | Cooper et al. | |
| 9,058,495 B2 | 6/2015 | Brannon et al. | |
| 9,224,000 B1 | 12/2015 | Ghetti | |
| 2002/0031225 A1 | 3/2002 | Hines | |
| 2004/0073617 A1 | 4/2004 | Milliken et al. | |
| 2004/0098348 A1 | 5/2004 | Kawasaki et al. | |
| 2004/0101141 A1 | 5/2004 | Alve | |
| 2004/0151323 A1 | 8/2004 | Olkin et al. | |
| 2005/0071280 A1 | 3/2005 | Irwin et al. | |
| 2006/0010324 A1* | 1/2006 | Appenzeller | H04L 9/0866 |
| | | | 713/171 |
| 2007/0174613 A1 | 7/2007 | Paddon et al. | |
| 2007/0219915 A1 | 9/2007 | Hatano et al. | |
| 2007/0271459 A1 | 11/2007 | Gomez | |
| 2008/0046718 A1 | 2/2008 | Grab et al. | |
| 2008/0077806 A1 | 3/2008 | Cui et al. | |
| 2008/0130902 A1 | 6/2008 | Foo Kune et al. | |
| 2009/0296926 A1 | 12/2009 | Perlman | |
| 2010/0005509 A1 | 1/2010 | Peckover | |
| 2010/0042838 A1 | 2/2010 | Ho | |
| 2010/0095127 A1 | 4/2010 | Banerjee et al. | |
| 2011/0145571 A1 | 6/2011 | Schmidt-Karaca et al. | |
| 2012/0185612 A1 | 7/2012 | Zhang et al. | |
| 2013/0024688 A1 | 1/2013 | Wen et al. | |
| 2013/0097421 A1 | 4/2013 | Lim | |
| 2013/0298202 A1 | 11/2013 | Warshavsky et al. | |
| 2014/0025786 A1 | 1/2014 | Gage | |
| 2014/0215590 A1 | 7/2014 | Brand | |
| 2014/0337930 A1 | 11/2014 | Hoyos et al. | |
| 2015/0101012 A1 | 4/2015 | White et al. | |
| 2015/0200958 A1 | 7/2015 | Muppidi et al. | |

* cited by examiner

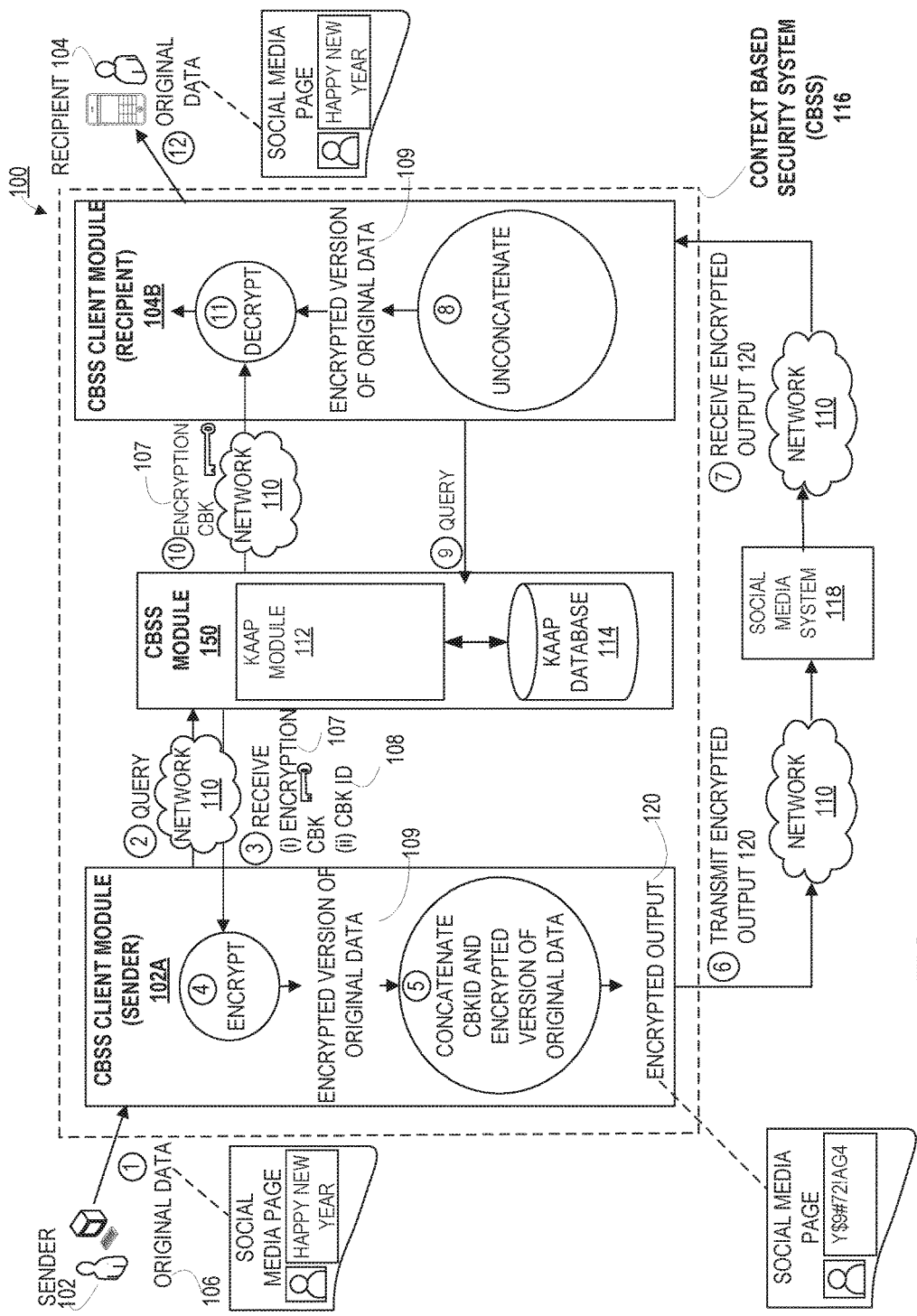
FIG. 1 OVERVIEW OF CONTEXT BASED SECURITY SYSTEM

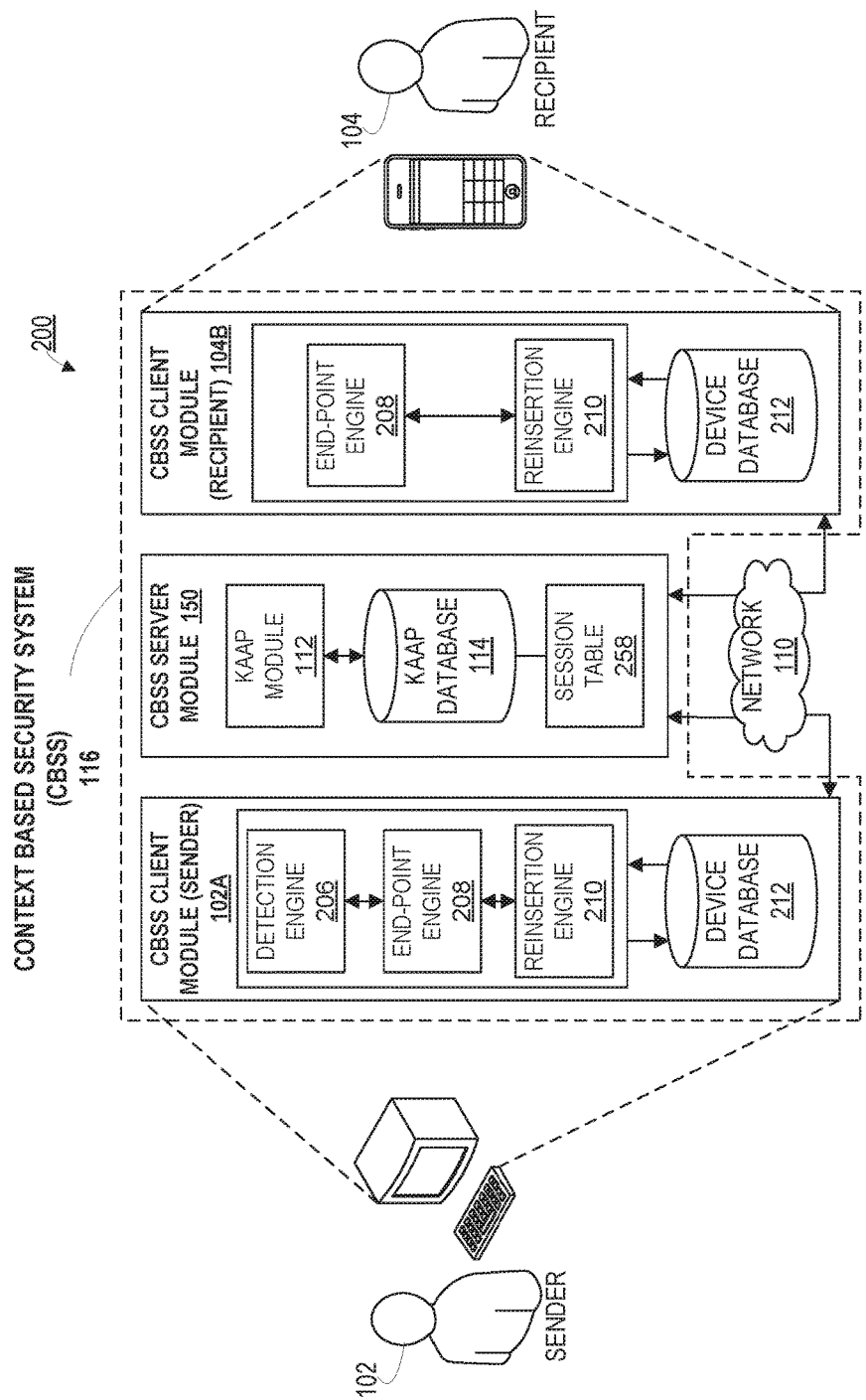
FIG. 2  EXEMPLARY SYSTEM ARCHITECTURE

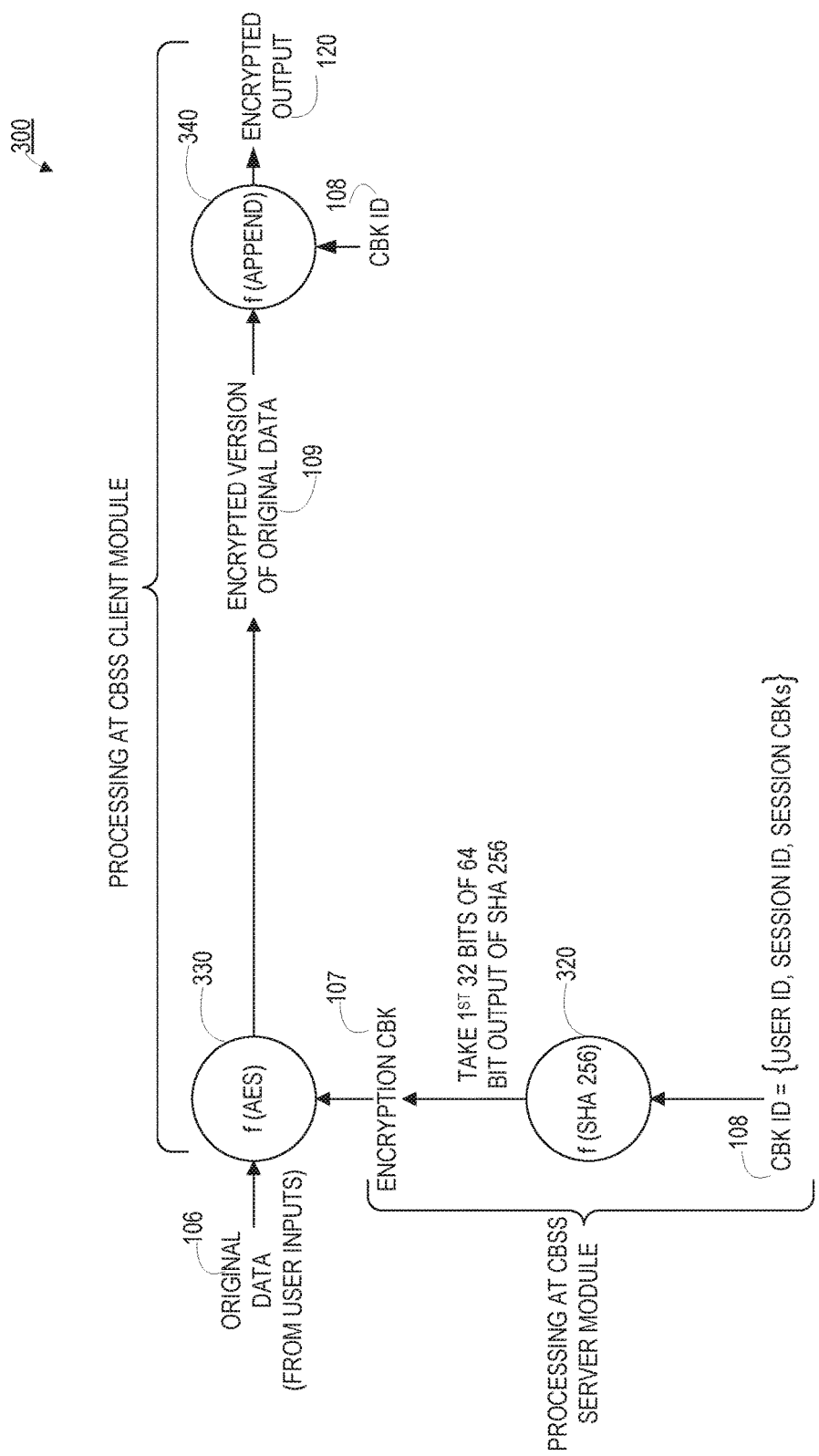
FIG. 3 EXEMPLARY SCHEMA SHOWING ENCRYPTION INCLUDING INTERMEDIATE STEPS AND DATA

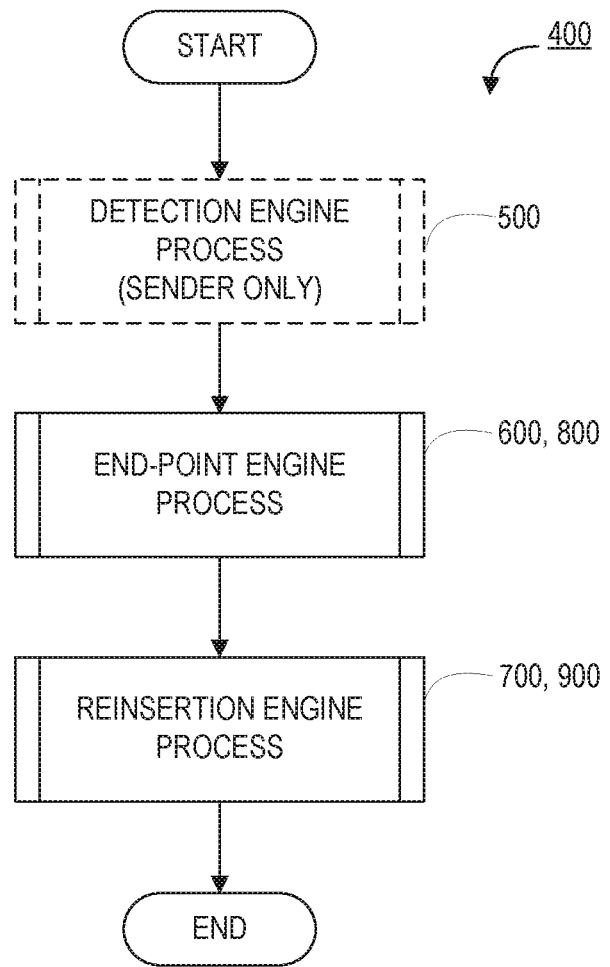
FIG. 4 EXEMPLARY CLIENT MODULE PROCESS
(SENDER PERSPECTIVES 500, 600, 700
RECIEPIENT PERSPECTIVES 800, 900)

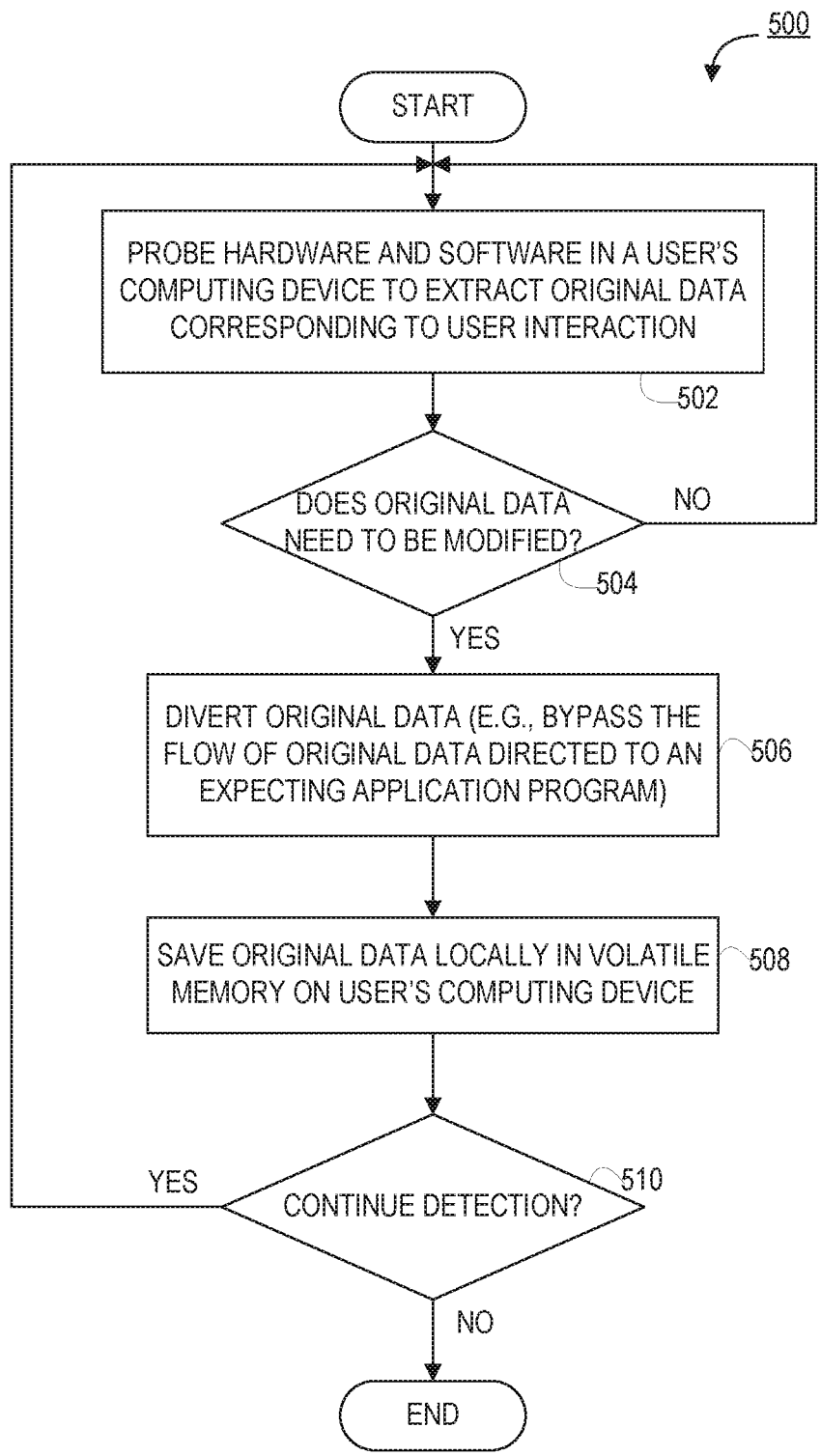
FIG. 5 EXEMPLARY DETECTION ENGINE PROCESS (SENDER'S PERSPECTIVE)

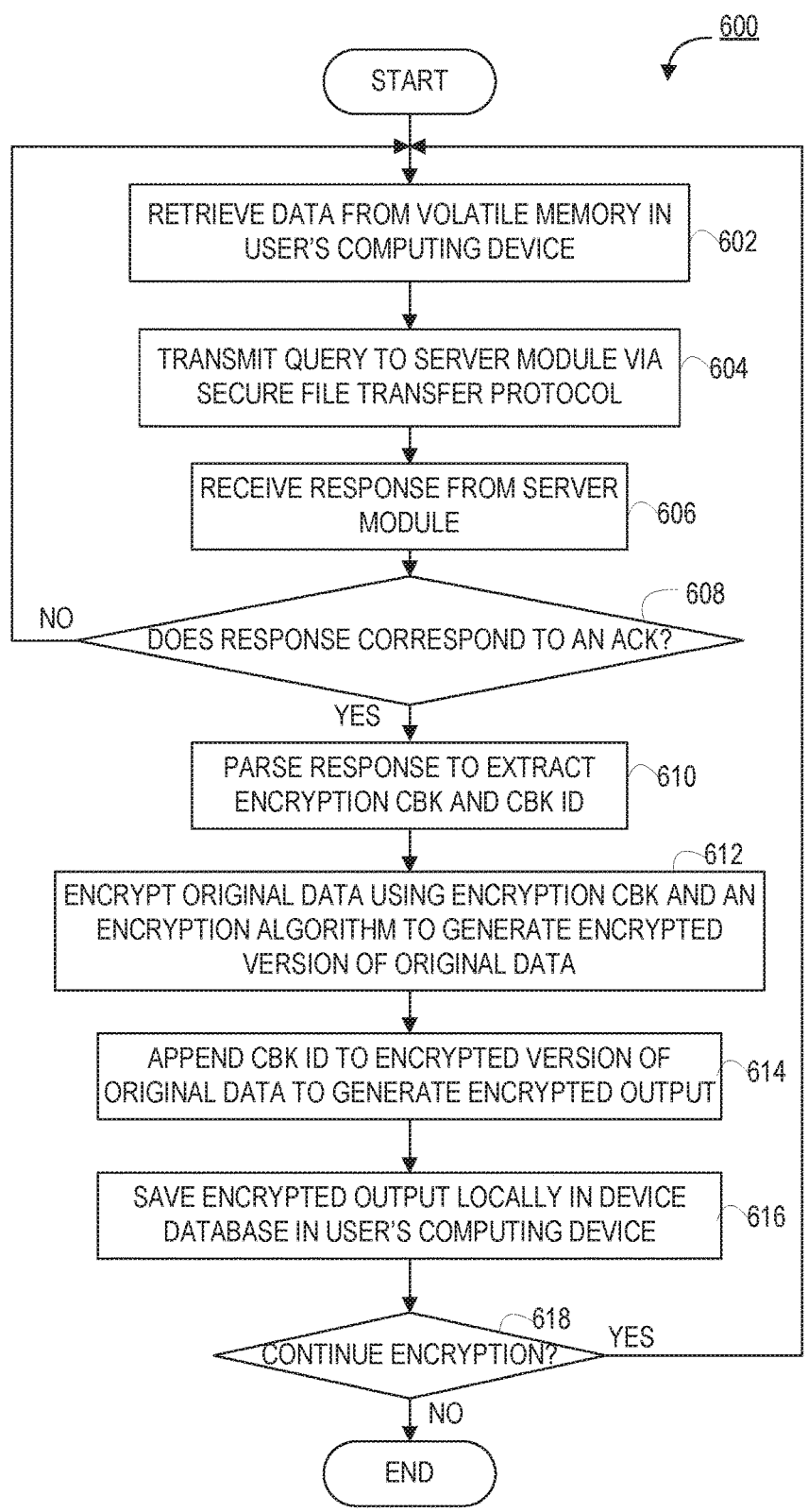
*FIG. 6* EXEMPLARY END-POINT ENGINE PROCESS
(SENDER'S PERSPECTIVE)

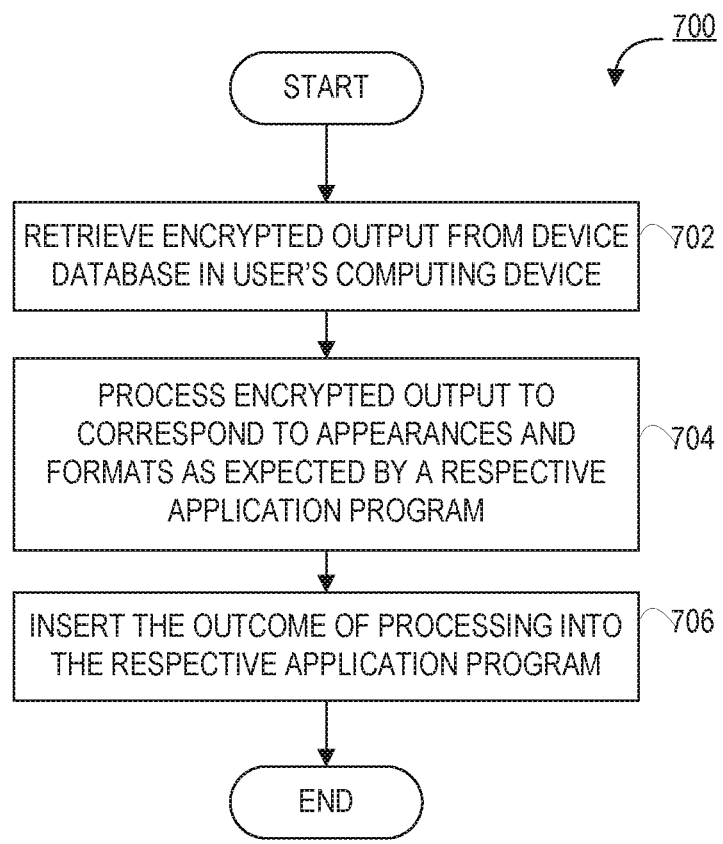
FIG. 7 EXEMPLARY REINSERTION ENGINE PROCESS (SENDER'S PERSPECTIVE)

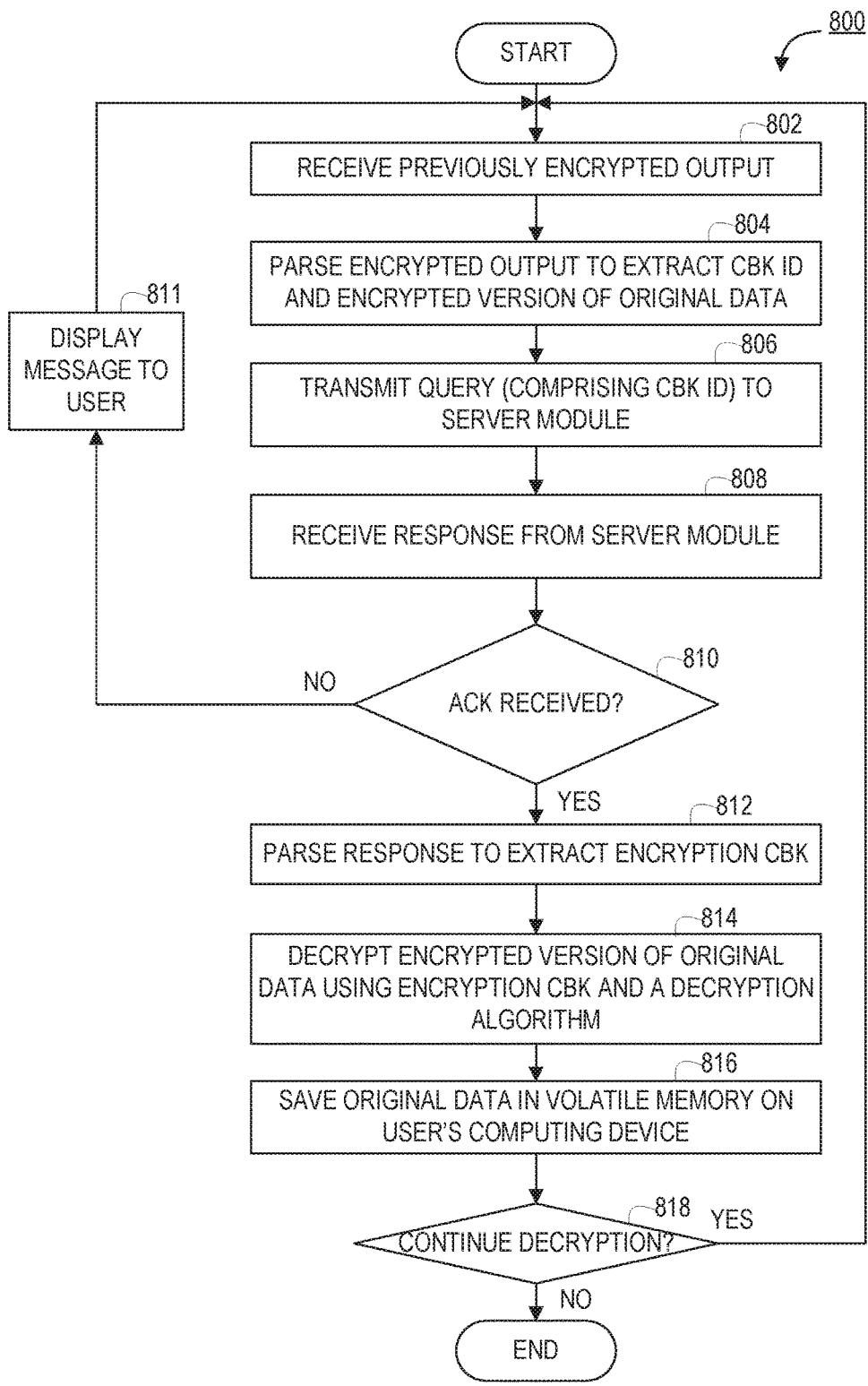
*FIG. 8* EXEMPLARY END-POINT ENGINE PROCESS
(RECIPIENT'S PERSPECTIVE)

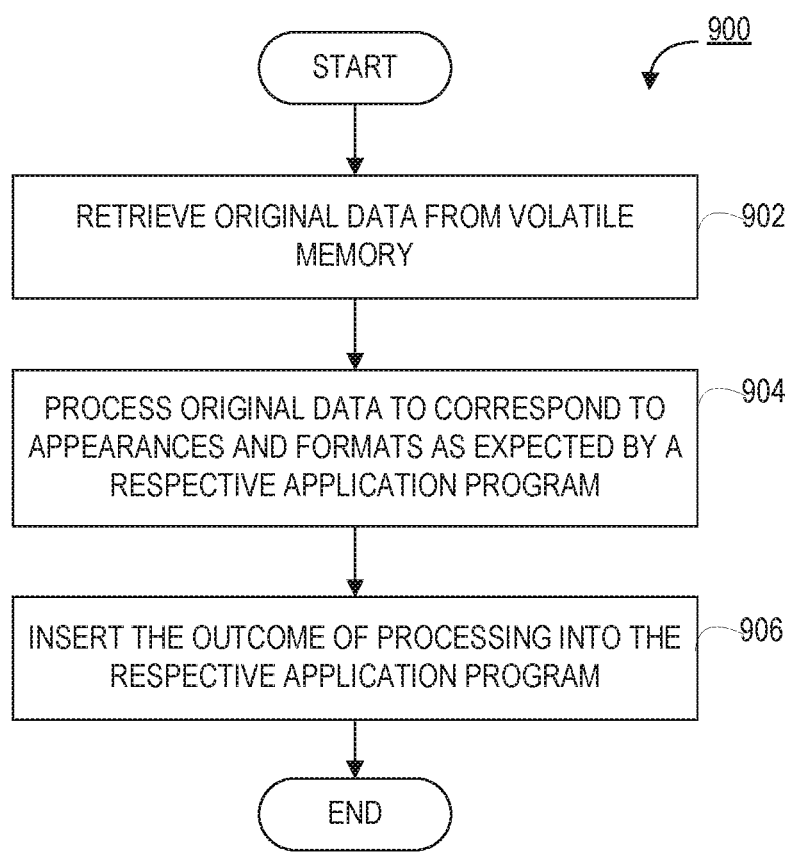
FIG. 9 EXEMPLARY REINSERTION ENGINE PROCESS
(RECIPIENT'S PERSPECTIVE)

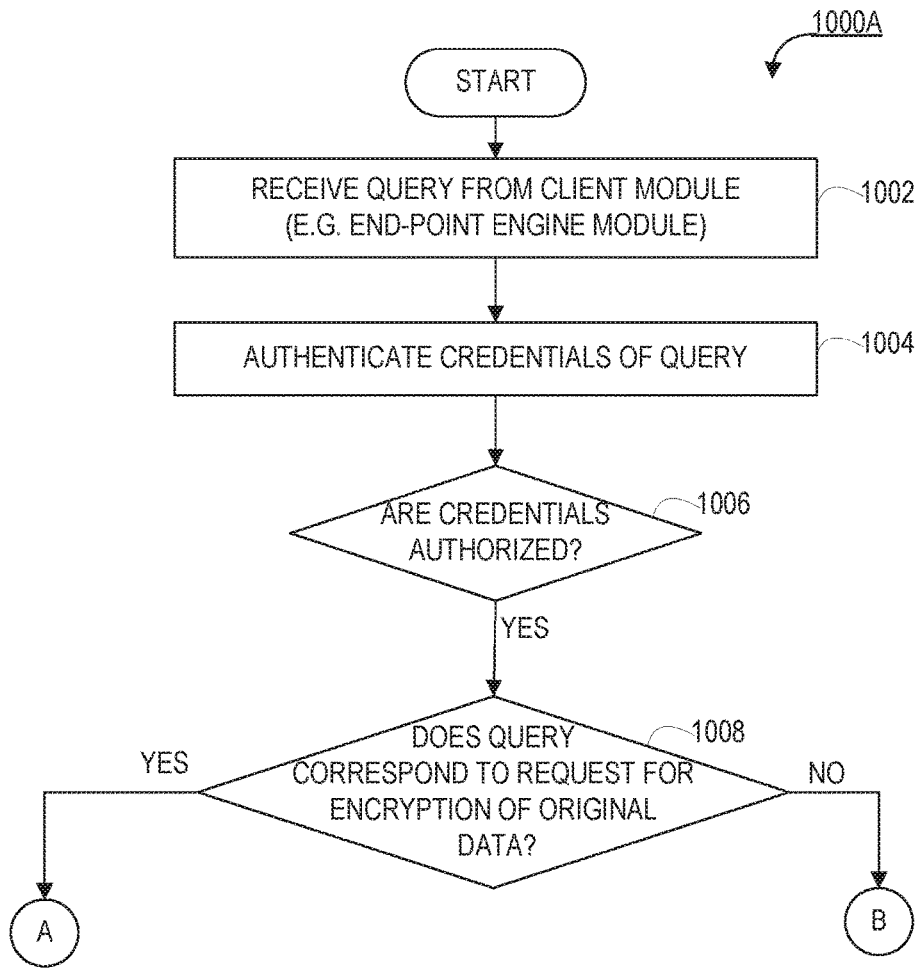
*FIG. 10A* EXEMPLARY SERVER MODULE (KAAP SERVER) PROCESS

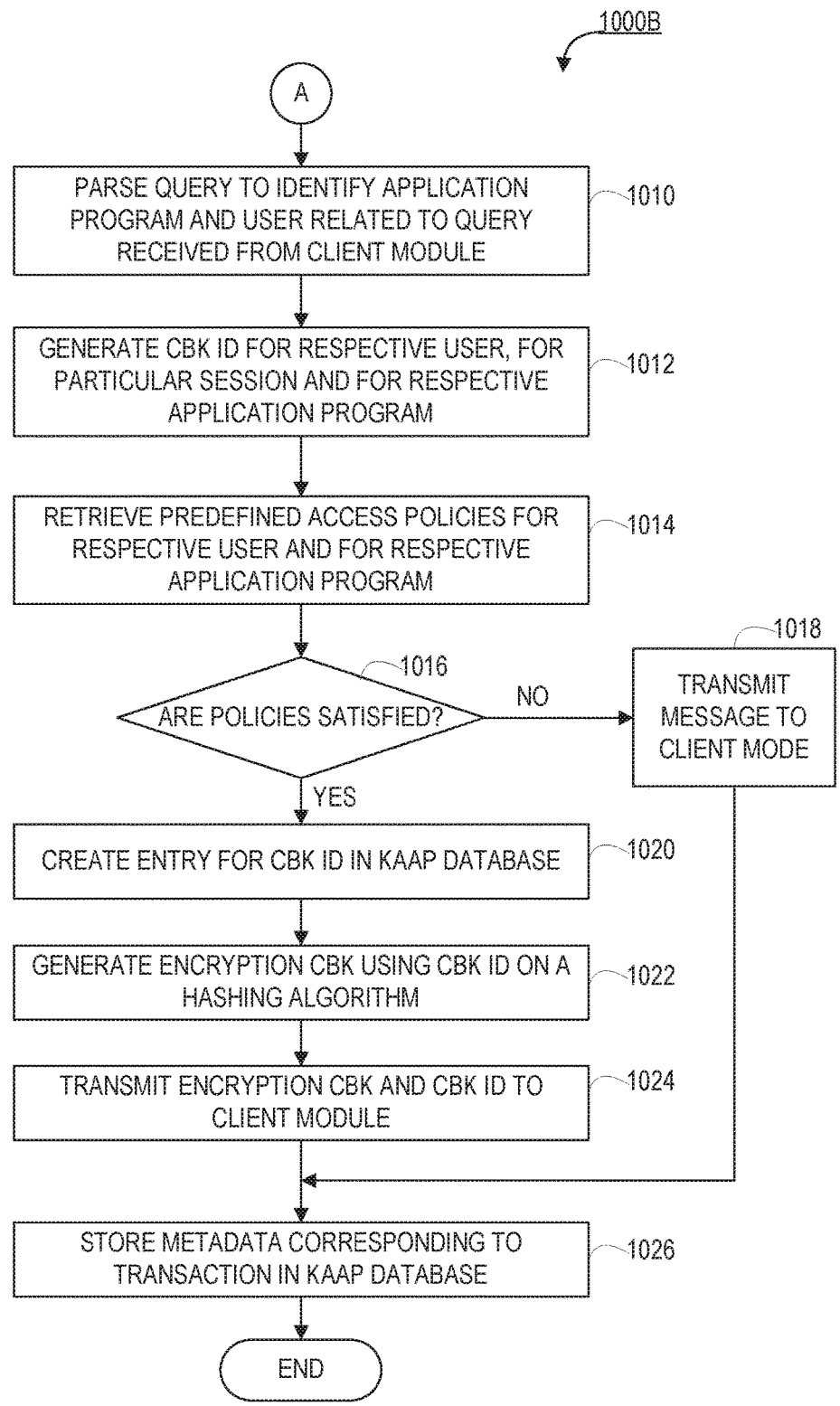
FIG. 10B EXEMPLARY SERVER MODULE (KAAP SERVER) PROCESS

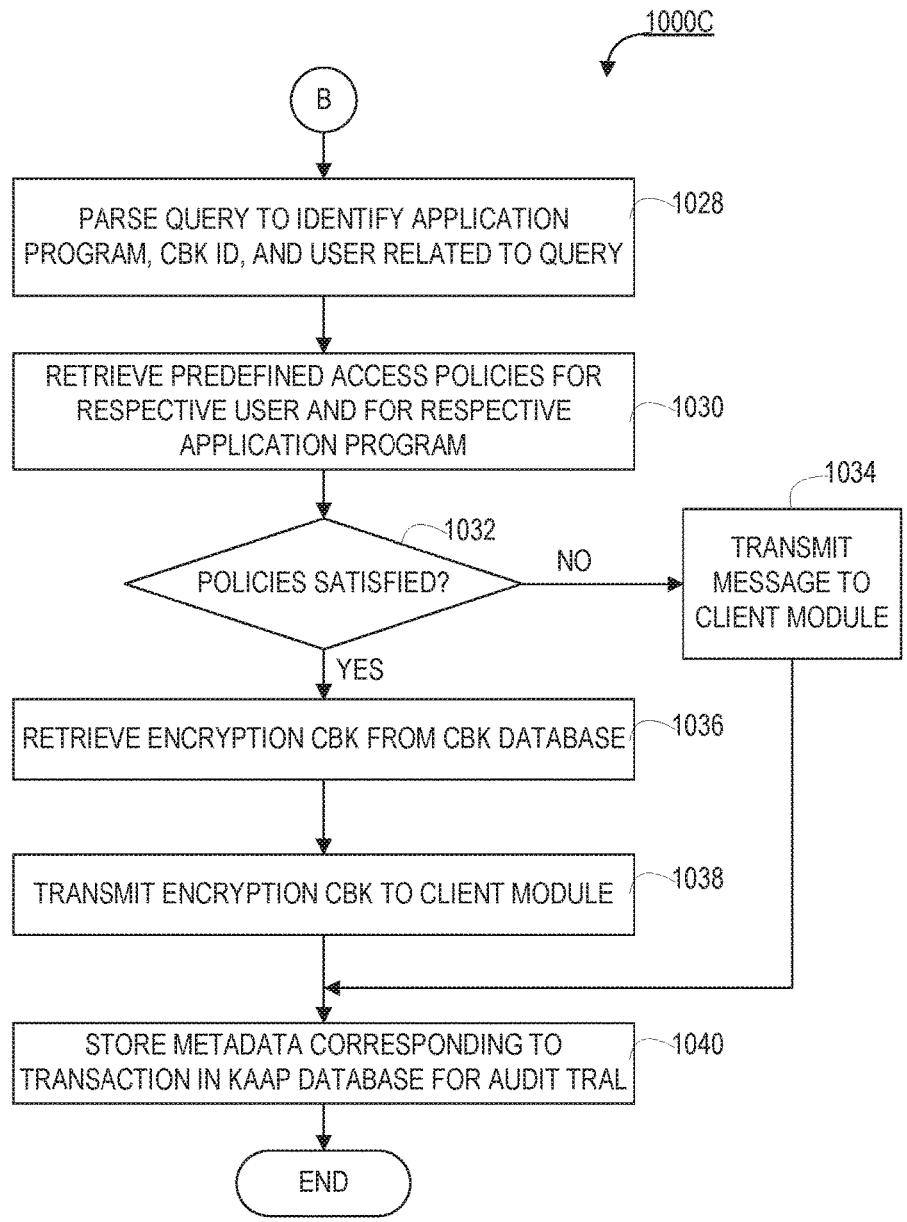
FIG. 10C  EXEMPLARY SERVER MODULE (KAAP SERVER) PROCESS

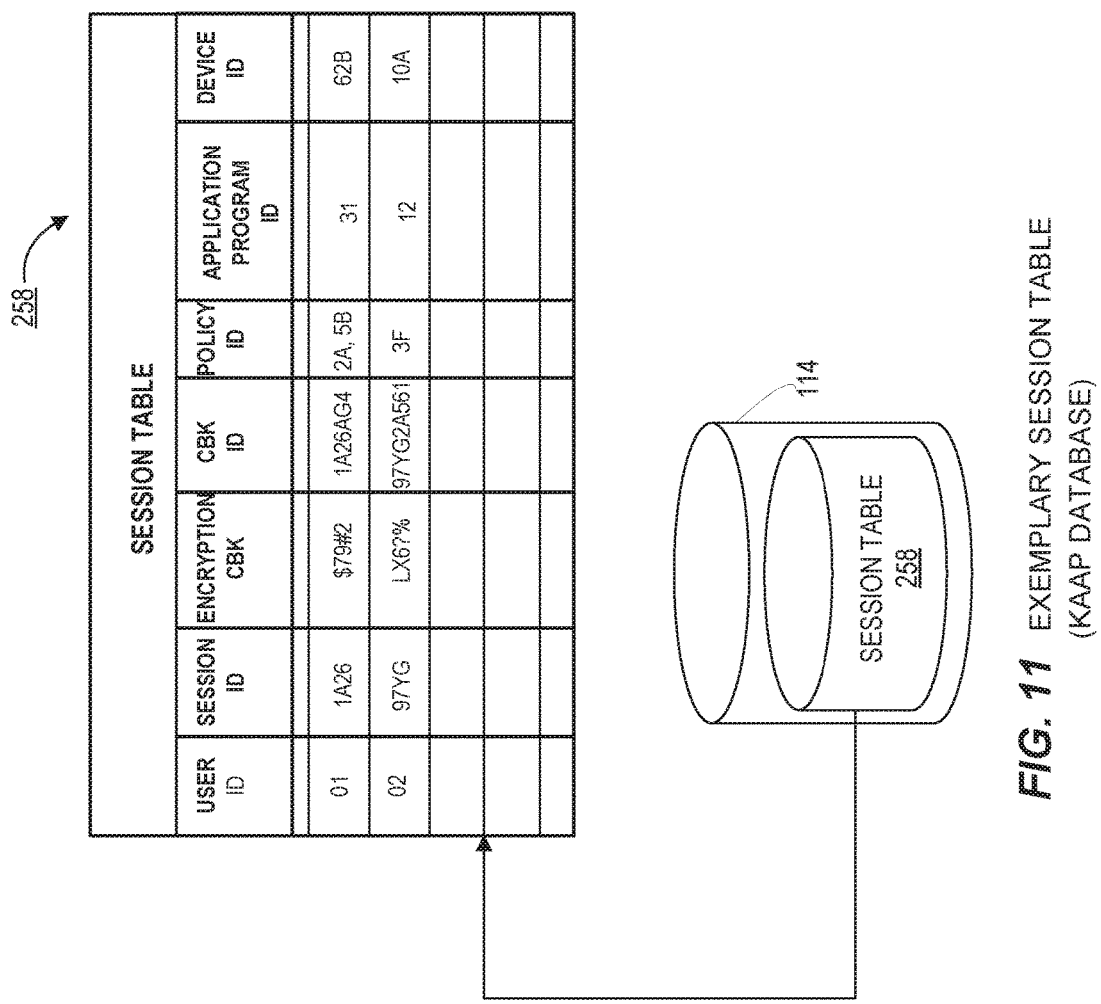
FIG. 11 EXEMPLARY SESSION TABLE (KAAP DATABASE)

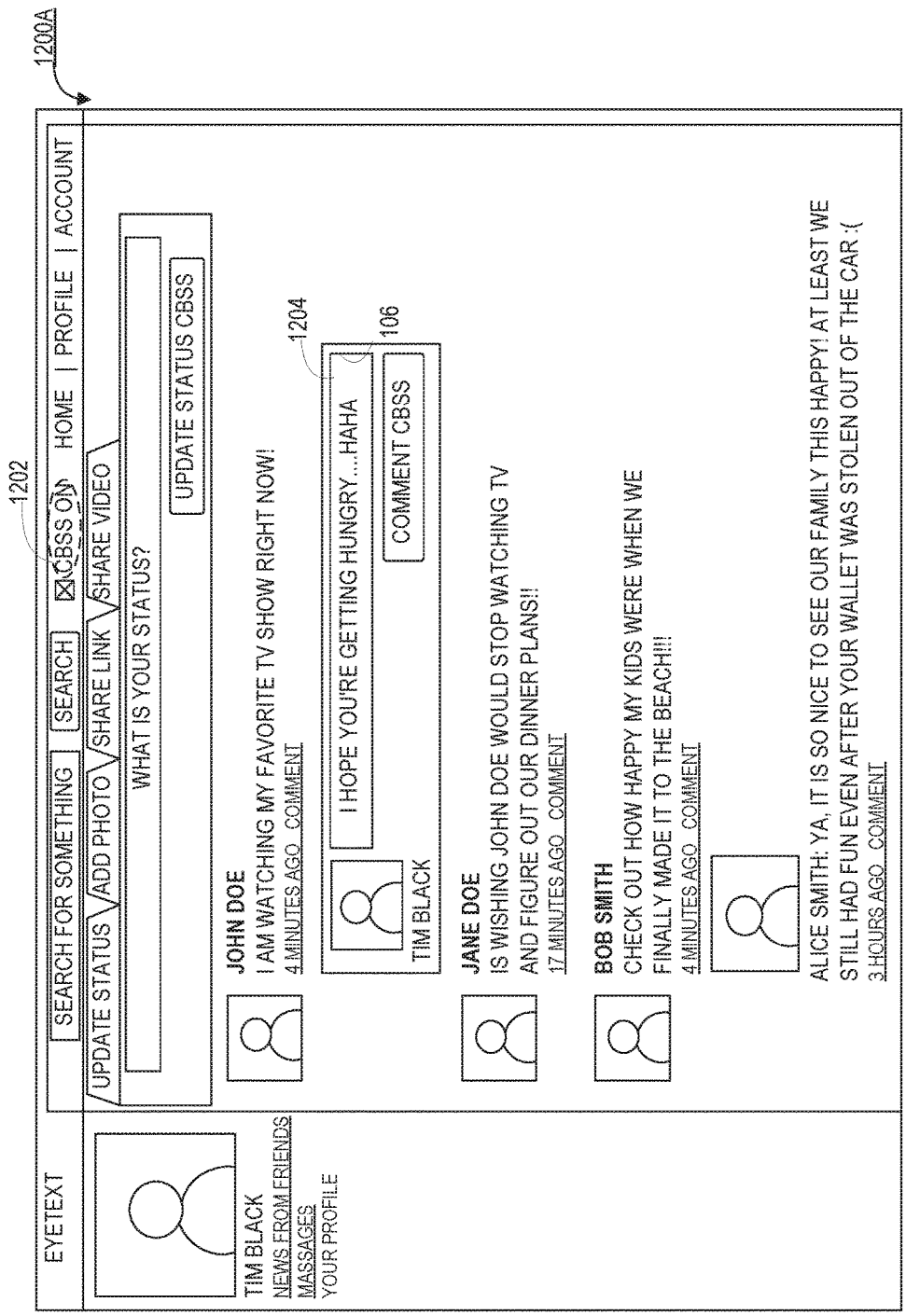
FIG. 12A EXEMPLARY CBSS EMBODIMENT INTEGRATED WITH A SOCIAL MEDIA SYSTEM
(SENDER'S PERSPECTIVE)

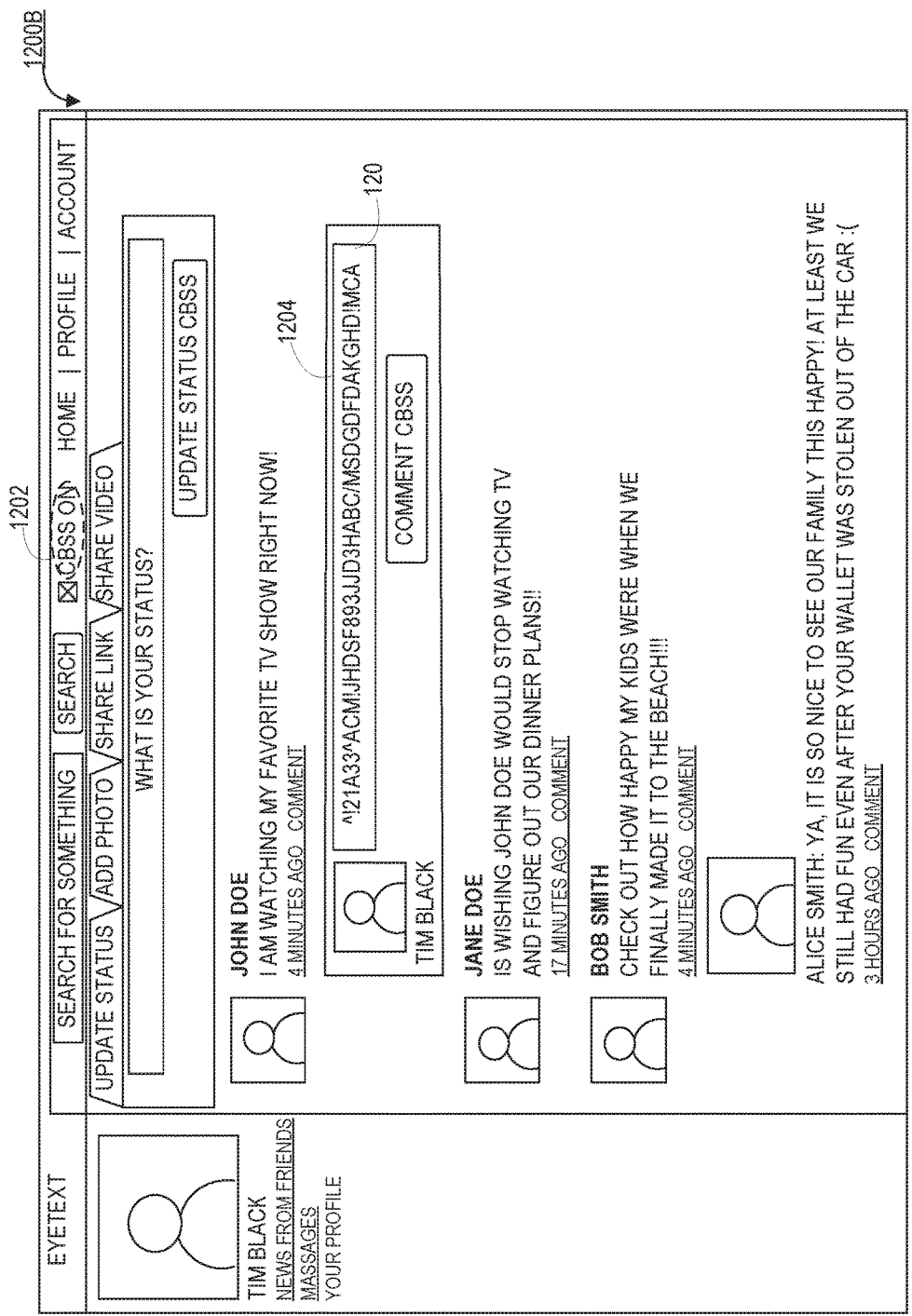
FIG. 12B EXEMPLARY CBSS EMBODIMENT INTEGRATED WITH A SOCIAL MEDIA SYSTEM
(SENDER'S PERSPECTIVE)

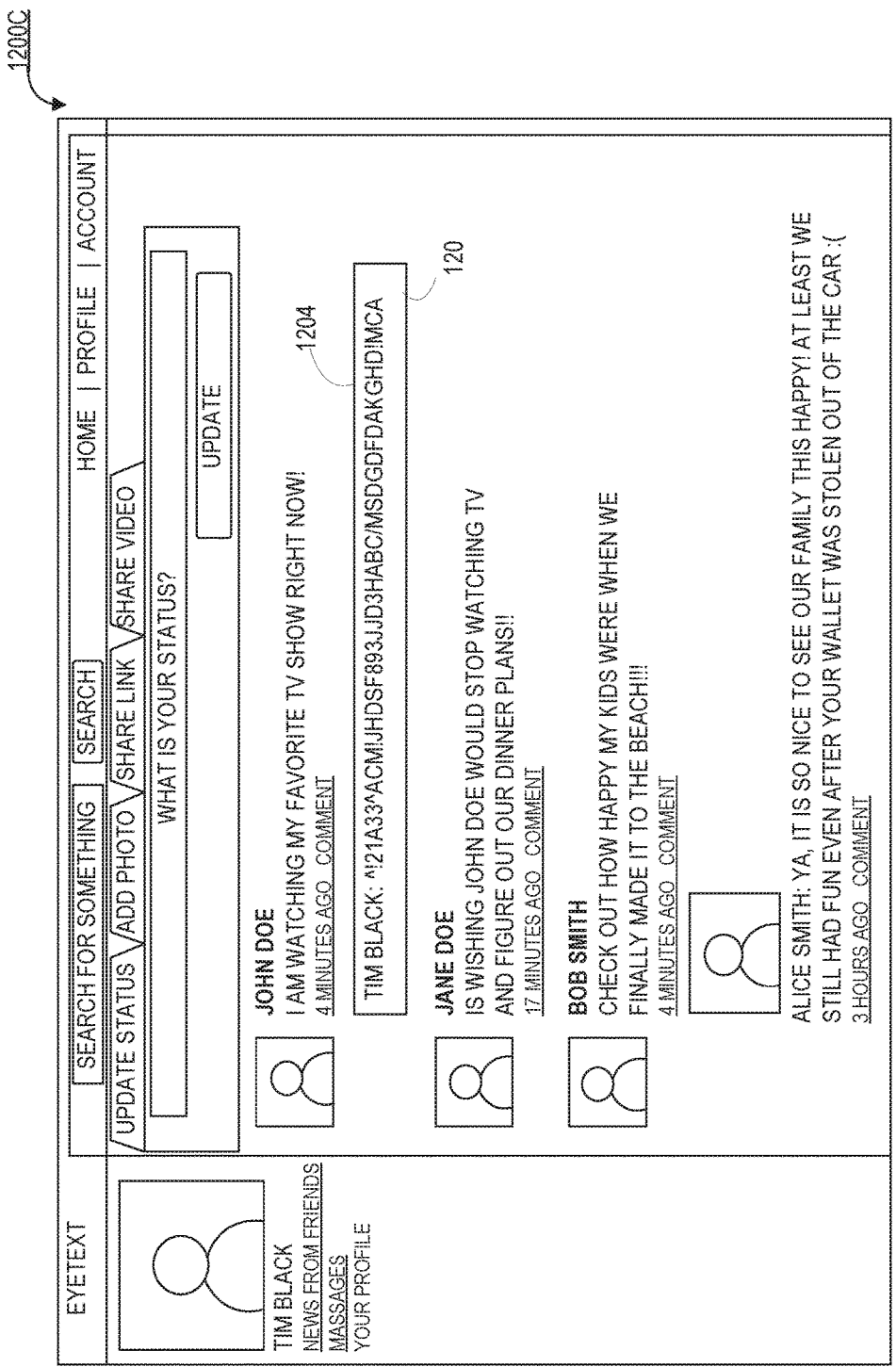
FIG. 12C EXEMPLARY CBSS EMBODIMENT INTEGRATED WITH A SOCIAL MEDIA SYSTEM (SENDER'S PERSPECTIVE)

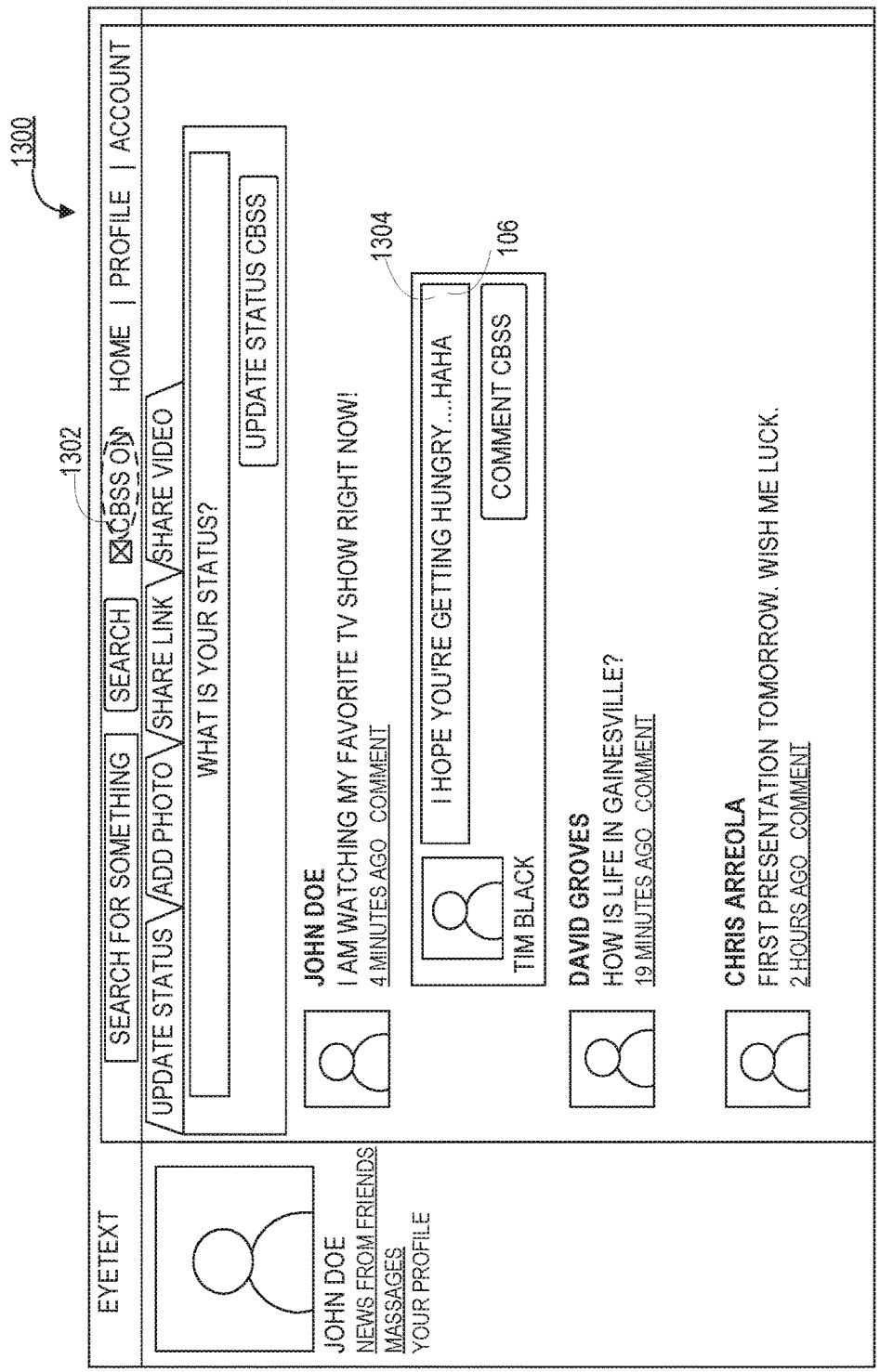
FIG. 13 EXEMPLARY CBSS EMBODIMENT INTEGRATED WITH A SOCIAL MEDIA SYSTEM
(RECIPIENT'S PERSPECTIVE)

SYSTEMS AND METHODS FOR PROVIDING INFORMATION SECURITY USING CONTEXT-BASED KEYS

CROSS REFERENCE TO RELATED APPLICATIONS

This application is a continuation of, and claims benefit of and priority under 35 U.S.C. §120 to U.S. Non-Provisional application Ser. No. 14/843,504, filed Sep. 2, 2015, and entitled "Systems and Methods for Providing Information Security Using Context-Based Keys", which is a continuation of U.S. Non-Provisional application Ser. No. 13/523,411, filed Jun. 14, 2012, and entitled "Systems and Methods for Providing Information Security Using Context-Based Keys", and claims benefit under 35 U.S.C. §119(e) of U.S. Provisional Patent Application No. 61/496,637, filed Jun. 14, 2011, and entitled "Automated Digital Communication Modification System", all of which are incorporated herein by reference as if set forth herein in their entireties.

TECHNICAL FIELD

The present systems and methods relate generally to information security, and more particularly to systems and methods that encrypt or secure data on a contextual basis. In one embodiment, data is secured using context-based keys that provide encryption and data security in connection with individual elements of data, or sessions associated with the data. Such data generally emerges from user interactions with a variety of application programs within a computing environment.

BACKGROUND

With identity theft and data security breach incidents on the rise in today's digital age, data (information) security is a major concern for individuals and organizations. Some of the reasons for identity theft and data security breach include hacking, loss or theft of equipment containing valuable data, phishing or other types of electronic eavesdropping, etc. The impact of identity theft and data security breach can be significant and long lasting. In that regard, various countries have enacted laws that govern the way personal data is handled, transferred and stored. Therefore, multinational companies operating in those countries have to abide by the laws for every country of operation. Further, companies may also lose potential business or partnership opportunities by failing to take privacy into account. Even further, from the perspective of obtaining customer trust, customers typically rely on companies, merchants, and organizations that provide data security. In some circumstances, such as healthcare, the financial industry, etc., protecting sensitive information and/or communications is of critical importance.

From the perspective of individuals, securing their data is equally important. For example, in 2011, it was reported that Sony's PLAYSTATION™ Network potentially exposed 100 million users to fraud in one of the largest data breaches in history. Personal information of customers who use online banking, or perform other financial and/or personal transactions are vulnerable to phishing, eavesdropping, and various other electronic intrusions, and therefore their data must be secured.

Most conventional information security methodologies (generally known as cryptographic systems) can be typically characterized as belonging to either an asymmetric key-based infrastructure alternatively known as a public-private key-based (PPK) infrastructure, or a symmetric key-based infrastructure.

Public-private key-based infrastructure is essentially an asymmetric cryptographic system (e.g., RSA-2048 algorithm, AES algorithm, and their variants) that generates two keys for every user—a public key and a private key. A public key is shared by a user (e.g., user A) with other users who wish to send data to user A. Thus, a user who wishes to send data to user A obtains user A's public key (that is publicly available), encrypts the data to be sent to user A, and finally sends the encrypted data. Upon receiving the encrypted data, user A uses a private key (typically, a secret key that is not publicly available) to decrypt the data. Without using the private key, data encrypted using this infrastructure is typically difficult to be decrypted.

However, a significant problem with systems designed using the PPK infrastructure is that every user must own a public key and a private key. The public key is shared with other users and used by them for encryption of data, whereas the data is decrypted using the user's private key. Thus, if a user's private key is ever compromised, any data sent to the user can be decrypted easily. For example, in an enterprise, private keys are more prone to be compromised as the private key is usually accessed by persons other than the key owner, such as IT department personnel, outside contractors, and the like. Moreover, key management is difficult because of the need for mapping key owners to a public key every time encrypted data is sent to a key owner. Also, if a user wants to change their public and/or private key, it would destroy the integrity of the data that has been encrypted previously. In other words, a significant disadvantage with the conventional PPK infrastructure is that keys are tied to persons. Therefore, changing either public or private keys makes it difficult to dynamically scale various aspects of key management. Additionally, a multi-party conversation (e.g., online conversations or communications involving more than two persons) can be problematic as every person must have access to every other person's respective key. Hence, this infrastructure is primarily used for encryption of individual emails, messages, and other such unitary types of data usually limited to two persons.

Other conventional cryptographic systems typically belong to the family of symmetric key-based systems (e.g., DES, BLOWFISH, and others), wherein a single key is used for encryption and decryption. In these systems, keys (conceptually similar to passwords) that protect the data are used, in addition to the data to be encrypted, as inputs into an algorithm that generates encrypted data as output. The person who wishes to decrypt the data uses the same key that was used during encryption. Thus, in the event the key becomes compromised, all the data protected with the key similarly becomes compromised. Symmetric key-based systems are used primarily for bulk data encryption and are flexible to allow for multi-party communications. Thus, the keys do not change with each new instance of data or user communication, but remain the same throughout the key lifecycle. Because, symmetric key-based systems require secret key exchanges between all of the communicating parties, their scalability is limited.

Generally speaking, most conventional data security systems of today are designed on a "thicker wall" approach using the above-mentioned systems. In other words, these systems attempt to secure the data while the data remains within the electronic premises of an organization's enterprise system, or a user's computing device. However, in today's digital age, such an approach is no longer workable, as the data is often circulated (and shared) among various other entities and systems, e.g., an organization's partners, a user's friends or acquaintances, SaaS providers, email providers, ISPs, hosting providers, and the like. Thus, because so many parties and chances for data leak are involved, there are many opportunities for data breach, hacking, inadequate security measures, and the like. Accordingly, if a individual user's key is compromised at any intermediate system or entity, every bit of data associated with that key is compromised. In summary, systems that assign keys to persons are problematic.

Therefore, there is a long-felt but unresolved need for a system or method that manages data security and keys based on instances of data, not individual users. Such a system therefore will generate context-based keys, e.g., the keys are based on the environment wherein the data is generated, such that every key relating to every instance of data is different. In contrast to conventional data security systems, the proposed system should have distinct aspects of authentication and encryption. Because authentication and encryption are considered distinct aspects, users should not encrypt data using a single key. On the contrary, data should be encrypted using context-based or data-based keys, and data access should be allowed based on authentication of users.

Further, the proposed key management system should provide auditing and validity capabilities, yet be scalable and flexible. Ideal auditing involves generation of an audit trail that is agnostic of the user's application software (e.g., web browser, email software, etc.) or even the operating system/platform on which the program is running.

Moreover, the authentication aspects of a desired system should provide the ability to manage the rights of individuals who are able to access data and/or programs according to pre-defined policies/roles, i.e., provide role-based access control functionality. In other words, an ideal key management system should be implemented in user computing device as a generic (i.e., device, platform, or application-agnostic) application software that does not require the use of specifically designed application programming interfaces (API's) in order to communicate with application programs and/or hardware associated with each user's respective computing device.

Further, the system should be highly interactive and easily configurable by users having minimal technical skills, and easily operable by system administrators. Further, the system should be easily accessible online by a plurality of users via their respective computing devices so that users can choose to secure data arising out of user interaction with any kind of software and/or hardware system associated any kind of computing device.

BRIEF SUMMARY OF THE DISCLOSURE

Briefly described, and according to one embodiment, aspects of the present disclosure generally relate to systems and methods for encrypting or otherwise securing data. According to one embodiment, the information security is accomplished using context-based encryption keys. Usually, such information to be secured arises from user interactions with software and/or hardware components included in a user's computing device. Generally, the data is secured both while stored inside a user's computing device and/or enterprise data storage system, or when electronically communicated to other person(s) or systems. Examples of data that may be secured/encrypted include (but are not limited to) audio files, video files, data files, system files, image files, or any form of digital data comprising emails, electronic documents, online messages, social media posts, web-based forms, etc., or any variant, sub-part, portion, or combination thereof. Generally, the data to be secured is generated by or associated with a user's entry or input with any kind of application programs and/or hardware across a variety of computing devices.

As will be described in greater detail herein, aspects of the disclosed system, referred to herein as a Context-Based Security System (CBSS), include a client-server architecture comprising proprietary client software installed in user computing devices and proprietary server software installed in a server computer operated by an entity that utilizes the disclosed system. In one aspect, the client software probes hardware and software associated with user computing devices in order to extract original data arising out of a user's interaction with a computing device (or application or platform operating on said computing device), thereby temporarily diverting the flow of original data directed towards an expecting application program running on the user's computing device. As will be understood, the present disclosure does not impose any limitations on the type or other specifics of application programs operating on user computing devices.

According to an aspect of the present disclosure, original data is encrypted or secured using a key created by an embodiment of the CBSS. According to yet another aspect, the key created by the CBSS is context-based and unique for every piece (instance) of data that is encrypted. For example, a context-based key might depend on environmental conditions associated with the context of the data, e.g., time instant at which the data is created, application program associated with the data, a unique user identifier, and other conditions. As will be described in greater detail in the discussions that follow, the result of encryption of the original data is referred to herein as the "encrypted version of the original data." In one embodiment, the encrypted version of the original data undergoes further processing and encryption, and is then referred to as "encrypted output." In one exemplary scenario involving "at-rest encryption", the encrypted output is stored in the user's computing device. Alternately, in scenarios wherein secure cryptographic communication is desirable, the encrypted output is shared by a sender with one or more other users (recipients). It will be understood that in many scenarios, such cryptographic communication can include one or more third party systems, providers, or services (e.g., social media systems, online bulletin boards, group email servers, etc.). Generally speaking, encryption is performed by inputting the original data and the key into a cryptographic algorithm such as (but not limited to) Advanced Encryption Standard (AES).

According to an exemplary CBSS aspect, functionalities of the server computer include management of encryption keys, including generation of context-based encryption keys when requested by CBSS clients (e.g., end user devices). Generally, such keys are stored inside exemplary CBSS databases (e.g., on the server computer) and provided to CBSS clients during a subsequent decryption process running in user computing devices. As will be understood, the disclosed CBSS allows the same data (e.g., a single document being utilized by several different members within an organization) originating from different CBSS clients to be secured with different encryption keys.

Furthermore, according to yet other aspects of the present disclosure, the server computer manages the rights of individual users who are able to send and/or access data according to pre-defined policies and/or roles. As will be understood by one skilled in the art, pre-defined policies roles ensure that only authorized users (e.g., depending on their roles within an organization) are able to access certain data and resources. For example, in an enterprise or corporate organization, an IT manager might be able to review any data associated with the enterprise and also change data access permissions of all employees; a director might access all data but not change access permissions; a departmental head might change permissions only for employees working in a department; a low-level employee may have very limited access to data, etc.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 1 is a high-level overview of an embodiment of the disclosed Context-Based Security System (CBSS) in an exemplary operating environment.

FIG. 2 shows architectural details of a CBSS comprising various software modules, data tables, and other similar elements, according to an embodiment of the present system.

FIG. 3 is an exemplary schematic showing an encryption process including intermediate processing steps and data, according to an embodiment of the present system.

FIG. 4 is a flowchart showing a summary of high-level, computer-implemented method steps illustrating exemplary CBSS-client module processes, involving sender and recipient perspectives, and performed by various software modules and engines in a user's (sender or recipient) computing device.

FIG. 5 is a flowchart showing an exemplary detection engine process running as an exemplary CBSS-client module process at a sender's computing device.

FIG. 6 is a flowchart showing an exemplary end-point engine process running as an exemplary CBSS-client module process at a sender's computing device.

FIG. 7 is a flowchart showing an exemplary reinsertion engine process running as an exemplary CBSS-client module process at a sender's computing device.

FIG. 8 is a flowchart showing an exemplary end-point engine process running as an exemplary CBSS-client module process at a sender's computing device.

FIG. 9 is a flowchart showing an exemplary reinsertion engine process running as an exemplary CBSS-client module process at a sender's computing device.

FIG. 10 (consisting of FIGS. 10A, 10B, and 10C) is a flowchart showing various steps performed in an exemplary CBSS-server module process.

FIG. 11 is an exemplary embodiment of a session table (stored in an exemplary CBSS database) displaying various session-related attributes in connection with user sessions.

FIG. 12 (consisting of FIG. 12A, FIG. 12B, and FIG. 12C) are screenshots of exemplary CBSS embodiments in connection with transmission of a cryptographic communication that is integrated with a third party application software program.

FIG. 13 is a screenshot of an exemplary CBSS embodiment in connection with reception of a cryptographic communication that is integrated with a third party application software program, from a recipient's perspective.

DETAILED DESCRIPTION

Prior to a detailed description of the disclosure, the following definitions are provided as an aid to understanding the subject matter and terminology of aspects of the present systems and methods, are exemplary, and not necessarily limiting of the aspects of the systems and methods, which are expressed in the claims.

DEFINITIONS/GLOSSARY

Context-based key (CBK): generally speaking, a key used in connection with encrypting or securing original data, wherein the key is generated based on the parameters of the environment/framework wherein the original data is generated, such that each key can be unique for each item of data generated. Examples of parameters affecting the "context" in which data is created may include, but are not limited to: user (user ID), application program being used to create the data (application program ID), specific computing session (session ID), computing device being used to create the data (computing device ID), network address, etc.

Context-based key identifier (CBK ID): a unique identifier corresponding to a particular context-based key (CBK). In one exemplary, non-limiting embodiment, a CBK ID is created using a combination of prior CBKs and other related information, such as by concatenating a user ID, session ID, and one or more session CBKs. (Please refer to FIG. 3 for exemplary details). In one exemplary aspect, a CBK ID is appended (concatenated) to an instance of the encrypted version of original data to generate corresponding encrypted output.

Cryptographic algorithm: a computer algorithm that performs tasks of encryption and/or decryption. Examples include, but are not limited to, AES, MD5, SHA 256, BLOWFISH, and many others.

Encrypted output: generally, the final outcome of an exemplary encryption process executed in a CBSS client operating on a user's/sender's computing device. The encrypted output is typically in a ciphertext format, and is either saved locally in a user's computing device, in an enterprise's database, remotely in a remote database server, and/or communicated via one or more networks to one or more recipients. (Please refer to FIG. 3 for exemplary details).

Encrypted version of original data: generally, un-decipherable information generated as a consequence of applying original data and a context-based key as input to a cryptographic algorithm. (Please refer to FIG. 3 for exemplary details).

Encryption CBK: a context-based key (CBK) that is used in exemplary encryption and decryption processes. Typically, the encryption CBK is generated with the help of a unique CBK ID and an encryption algorithm, in a server module. (Please refer to FIG. 3 for exemplary details). Generally synonymous with context-based key (CBK).

Original data: digital information that is to be encrypted or secured. Generally, original data is generated by a user via an application program (software) and/or hardware system, or is associated with an electronic or digital file. Examples of original data include, but are not limited to, audio files, video files, data files, system files, image files, or any form of digital data comprising emails, electronic documents, online messages, social media posts, web-based forms, etc., or any variant, sub-part, portion, or combination thereof. Generally synonymous with original information.

Session: an instance or period of time that is related to creation or utilization of original data.

Session CBK: generally comprising a previously generated encryption CBK. In one embodiment, session CBKs are used as a component or sub-part in creating a new CBK for purposes of processing and data efficiency.

Session identifier (ID): a unique identifier corresponding to a particular session, and correspondingly, a session CBK.

Overview

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether or not a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

In the following text, references to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context.

Aspects of the present disclosure generally relate to systems and methods for encrypting or otherwise securing data. According to one embodiment, the information security is accomplished using context-based encryption keys. Usually, such information to be secured arises from user interactions with software and/or hardware components included in a user's computing device. Generally, the data is secured both while stored inside a user's computing device and/or enterprise data storage system, or when electronically communicated to other person(s) or systems. Examples of data that may be secured/encrypted include (but are not limited to) audio files, video files, data files, system files, image files, or any form of digital data comprising emails, electronic documents, online messages, social media posts, web-based forms, etc., or any variant, sub-part, portion, or combination thereof. Generally, the data to be secured is generated by or associated with a user's entry or input with any kind of application programs and/or hardware across a variety of computing devices.

As will be described in greater detail herein, aspects of the disclosed system, referred to herein as a Context-Based Security System (CBSS), include a client-server architecture comprising proprietary client software installed in user computing devices and proprietary server software installed in a server computer operated by an entity that utilizes the disclosed system. In one aspect, the client software probes hardware and software associated with user computing devices in order to extract original data arising out of a user's interaction with a computing device (or application or platform operating on said computing device), thereby temporarily diverting the flow of original data directed towards an expecting application program running on the user's computing device. As will be understood, the present disclosure does not impose any limitations on the type or other specifics of application programs operating on user computing devices. Generally, examples of application programs include (but are not limited to) word processing software, spreadsheet software, database software, multimedia software, presentation software, education software, simulation software, content access software, social media software, game software, or any other type of generic or special-purpose software. It will be further appreciated that aspects of the present disclosure also provide information security to software elements associated with various technologies such as OLE (Object Linking and Embedding) and other similar technologies.

According to an aspect of the present disclosure, original data is encrypted or secured using a key created by an embodiment of the CBSS. According to yet another aspect, the key created by the CBSS is context-based and unique for every piece (instance) of data that is encrypted. For example, a context-based key might depend on environmental conditions associated with the context of the data, e.g., time instant at which the data is created, application program associated with the data, a unique user identifier, and other conditions. As will be described in greater detail in the discussions that follow, the result of encryption of the original data is referred to herein as the "encrypted version of the original data." In one embodiment, the encrypted version of the original data undergoes further processing and encryption, and is then referred to as "encrypted output." In one exemplary scenario involving "at-rest encryption", the encrypted output is stored in the user's computing device. Alternately, in scenarios wherein secure cryptographic communication is desirable, the encrypted output is shared by a sender with one or more other users (recipients). It will be understood that in many scenarios, such cryptographic communication can include one or more third party systems, providers, or services (e.g., social media systems, online bulletin boards, group email servers, etc.). Generally speaking, encryption is performed by inputting the original data and the key into a cryptographic algorithm such as (but not limited to) Advanced Encryption Standard (AES).

According to an exemplary CBSS aspect, functionalities of the server computer include management of encryption keys, including generation of context-based encryption keys when requested by CBSS clients (e.g., end user devices). Generally, such keys are stored inside exemplary CBSS databases (e.g., on the server computer) and provided to CBSS clients during a subsequent decryption process running in user computing devices. As will be understood, the disclosed CBSS allows the same data (e.g., a single document being utilized by several different members within an organization) originating from different CBSS clients to be secured with different encryption keys.

Furthermore, according to yet other aspects of the present disclosure, the server computer manages the rights of individual users who are able to send and/or access data according to pre-defined policies and/or roles. As will be understood by one skilled in the art, pre-defined policies roles ensure that only authorized users (e.g., depending on their roles within an organization) are able to access certain data and resources. For example, in an enterprise or corporate organization, an IT manager might be able to review any data associated with the enterprise and also change data access permissions of all employees; a director might access all data but not change access permissions; a departmental head might change permissions only for employees working in a department; a low-level employee may have very limited access to data, etc.

Generally, because aspects of the present disclosure utilize cryptographic keys (CBKs) that are not simply user-dependent or system-dependent, but rather are context-dependent an can be tied to and generated for each new item of data that is generated or accessed within a system, aspects of the present system are highly secure. Further, one advantage to context-based encryption is that subsequent downstream users or processes that are unauthorized to view or access certain data will not have access to it. For example, in conventional systems, once an item of data has been decrypted, if that decrypted data is communicated to a third party or left decrypted within an application or system, then non-authorized users will be able to view or access that data. In embodiments of the present system, however, that data always remains encrypted (assuming the user chooses to have it remain encrypted) such that only authorized users utilizing an embodiment of the present system (e.g., plugin) will have the ability to view, access, or otherwise interact with the encrypted data.

Various specifics, details, and system embodiments will be better understood in the description provided in greater detail below. It should be noted that the description in this disclosure refers to terms having somewhat overlapping or similar meanings or connotations, such as "encrypted output", "encrypted version of original data", and others. Detailed definitions of such terms have been provided in the glossary above and also in connection with FIG. 3 (below). Thus, it will be assumed that distinctions between such terms will be clear based on the associated context in this disclosure, wherever applicable. However, no limitations on the terms are intended or imposed by this disclosure, and it is assumed that the context of the usage of such terms will dictate their ultimate meaning.

Exemplary Embodiment

Referring now to the figures, FIG. 1 illustrates a conceptual overview of one embodiment of the present Context-Based Security System (CBSS) 116 in an exemplary environment, constructed and operated in accordance with various aspects of the present disclosure. In one embodiment, the CBSS 116 encrypts or secures data or information based on the context in which the data is created. In the example shown in FIG. 1, the original data 106 is encrypted and then subsequent decrypted using the same context based key (CBK) (or encryption CBK) during encryption and decryption. Details of usage of the encryption context-based key (CBK) will be better understood in connection with the discussion of FIGS. 3, 6, 8, and 10.

As shown in FIG. 1, users 102 (a sender) and 104 (a recipient) utilize functionalities of the CBSS for purposes of cryptographic communications. As will be understood and appreciated, aspects of the present system 116 do not have to be used in a communication environment, but can be used to encrypt electronic documents or other files for storage and subsequent use. In FIG. 1, it is shown that the CBSS allows cryptographic communication between a sender (user 102) and a recipient (user 104) involving a third party service such as a social media system. This generally involves the CBSS 116 operating a client module 102A that runs inside a computing device of a sender 102, a client module 104B running inside a computing device of a recipient 104, and additionally, one or more server modules 150 that are connected to client modules 102A and 104B via networks 110. Generally, the client modules comprise proprietary software algorithms, modules, or applications used to perform the functionalities of the client modules. In one aspect, the server module 150 (e.g., installed on a dedicated server or a general purpose computer in a facility, or, in the "cloud") provides functionalities of key management, authorization/access control, and auditing and policy control, these functionalities collectively abbreviated as "KAAP." The server module 150 further comprises a KAAP module 112 and an exemplary KAAP database 114. Details of the server module 150, particularly the steps performed in the KAAP module 112 (and its constituent modules) will be explained later herein, e.g., in connection with FIGS. 2 and 10 (consisting of 10A, 10B, and 10C) and in other places in the disclosure. Details of the client modules 102, 104 will be described in connection with FIGS. 2, 3-9. Exemplary data tables stored in the KAAP database will be discussed in connection with FIGS. 11 and 12.

As shown in FIG. 1, the CBSS server module 150 communicates with CBSS client modules 102A and 104B via networks 110 (such as, but not limited to the Internet) and typically involves the usage of one or the other services, e.g., a Web-deployed service with client/service architecture, a corporate Local Area Network (LAN) or Wide Area Network (WAN), a cellular data network, or through a cloud-based system. Moreover, as will be understood and appreciated, various networking components like routers, switches, hubs etc., are typically involved in the communications. Although not shown in FIG. 1, it can also be further understood that such communications may include one or more secure networks, gateways, or firewalls that provide additional security from unwarranted intrusions and cyber attacks. Additionally, CBSS server modules and client modules can include operative network connections to various other users, systems, and third parties via networks 110.

According to an aspect of the present disclosure, CBSS client modules 102A and 104B run on users' (senders' and recipients') electronic devices (e.g., desktop computers, laptop computers, cellular phones, mobile devices, tablet PCs, or any other device capable of accessing a network or the Internet) and are proprietary software programs (e.g., plugins) that run transparently in the background (i.e., in an "always on" operating mode) on the users' devices. According to one embodiment, when a user desires to encrypt or secure original data, the original data does not leave the user's computing device. Rather, an un-decipherable form of the original data (as a result of exemplary encryption processes) is transmitted from the device to its intended destination. According to yet another aspect, user electronic devices may comprise mobile devices (e.g., smart phones) and hence, CBSS client modules 102A and 104B can also be configured as a mobile device application (mobile app) such as that available for the popular APPLE® IPHONE® and GOOGLE® ANDROID® mobile device operating systems.

For purposes of example and explanation, it can be assumed that users (e.g., senders 102 and recipients 104) will initially register with an embodiment of the CBSS 116. The registration (usually a one-time activity) can be accomplished in a conventional manner via a CBSS web interface, hosted on server module 150, or any other server operatively connected to the server module 150. Alternately, the registration can also be done via CBSS client modules (e.g., 102A and 104B) that communicate with the CBSS server module 150. During registration, users 102, 104 or system administrators provide registration information, such as name, email address, and other similar types of information that are stored in a KAAP database 114.

Furthermore, although not shown in FIG. 1, it will be understood that in alternate embodiments, the CBSS 116 can include one or more client module databases inside a user's (sender/recipient) computing device. Generally, CBSS client modules running on user computing devices will have access not only to CBSS client module databases, but also to volatile as well as non-volatile memory (e.g., RAM, hard drive, external drives, flash memory, etc.) associated with a user's computing device in addition to KAAP databases 114.

Additionally, users or system administrators can leverage access control functionalities of the CBSS by specifying various rules (alternately referred to as policies herein) during initialization of the CBSS 116, or during normal operation. As will be understood, rules/policies govern the rights of users to access data and/or associated software programs, in order to achieve information security. These rules can be specified through a script developed using a scripting language, or specified via a user's mobile device, or developed in some other manner as will occur to one of ordinary skill in the art. These rules are typically stored in an exemplary KAAP database 114, or more generally a CBSS database.

Consider the following exemplary scenarios in which embodiments of the present system may be used to secure information or data. In one exemplary scenario, in a hypothetical corporate organization, confidential emails sent by the CEO using MICROSOFT™ OUTLOOK™ to internal employees of the organization are encrypted in order to provide information security. Consequently, non-employees (e.g., outside contractors and suppliers), or even unauthorized employees, who somehow manage to obtain copies of the emails will not be able to decipher the content of such confidential emails. Further, the CEO might restrict certain emails only to those individuals who have appropriate access rights (based on predetermined policies or rules), such as members of the executive management team. Generally, policies can be based on various conditions as will occur to one skilled in the art. Examples of such conditions include the role of the user from whom the query originated, the IP address/location of the user, the time of the day at which the query originated, and various other parameters relating to the originating environment of the query. Exemplary policies will be discussed in connection with FIG. 11.

In another exemplary scenario, a user who publishes messages on social media systems (e.g., TWITTER™, FACEBOOK™, and the like) might restrict the ability to view his or her messages to selected friends of the user. Information identifying the selected friends may be initially specified by the user to the CBSS 116. Subsequently, persons aside from the user's selected friends will not be able to decipher the user's messages published by the user on the social media system, as the messages or posts will appear encrypted or as ciphertext to any non-authorized users. These aspects, along with various other details of the client modules (and also server modules) will be understood in greater detail in the discussions that follow herein.

Generally, by way of example, and not by way of limitation, a high level summary of actions involved in an exemplary cryptographic communication (between a sender 102 and a recipient 104 involving a social media system 118) is shown in FIG. 1, with the help of a sequence of numbered steps indicated as steps "1" through "12" and annotated as circled numbers. In this exemplary scenario, it is assumed that a sender 102 (generally, a CBSS user) wishes to publish (at step 1) an instance of original data 106 on a social media page using a computing device. It will be understood that the said social media page (hosted on a social media system) may be associated with the sender 102 himself, or can belong to other users, organizations, or entities. In the example shown, the original data that the sender 102 wishes to publish is a message "Happy New Year".

Generally, the CBSS client module 102A tracks input (e.g., text entered into a text-entry field) by users (senders) directed to expecting third party application programs or software (e.g., web-browsers, email programs, mobile apps or any other external programs) for purposes of identifying original data 106 that needs to be secured. In one embodiment, a CBSS client module 102A detects original data input 106 by a user, and thereafter diverts the data flow from the expecting third party application program into modules within the CBSS client module 102A (sender). Details of steps involved in detection and diversion of original data 106 will be further discussed in connection with FIGS. 4 and 5. Generally and in one embodiment, the CBSS 116 secures or encrypts original data 106 directed to third party application programs or software, without any limitations on the type, number of running programs, or the platform (operating system) associated with such programs or software. In embodiments wherein users or system administrators do not wish to secure their data, CBSS client modules 102A provide a toggle switch to turn off provision of data security.

Still referring to FIG. 1, before being published on the respective social media system, the CBSS client module 102A in the sender's computing device transmits (at step 2) a query comprising a user ID, a session ID (e.g., generally related to a time instance of creation of original data), an application program ID corresponding to the expecting third party application program that the user (sender) is interacting with, and other relevant information to the server module 150 via the network 110. (As will be understood and appreciated by a person skilled in the art, because of the real-time nature of the above scenario, steps involved in a cryptographic communication are performed in real-time or in virtually real-time, and happen in an expeditious and generally imperceptible manner to the user.) In one aspect, the CBSS server module 150 verifies that the query from user 102 satisfies predefined access control policies. Correspondingly, at step 3, the CBSS server module 150 generates (i) an encryption context-based key (CBK) 107 and (ii) a CBK ID 108, and transmits the CBK and CBK ID to the CBSS client module 102A. Generally, the CBK ID and CBK that are generated at step 3 are unique to the particular instance of data 106 to be secured. Details of generation of the encryption CBK 107 and CBK ID 108 will be discussed in greater detail in connection with FIG. 10.

According to one embodiment, upon receiving the encryption CBK 107 from the CBSS server module, the CBSS client module 102A encrypts the original data 106 at step 4 using an encryption algorithm and the encryption CBK 107. The outcome of encrypting the original data 106 is referred to herein as the encrypted version of the original data 109. (Details of an exemplary encryption process and associated terminologies will be explained in connection with FIG. 3.) Examples of encryption algorithms include (but are not limited to) Advanced Encryption Standard (AES), Data Encryption Standard (DES), and various other such algorithms. In one embodiment, at step 5, the CBSS client module 102A concatenates the encrypted version of original data 109 with the CBK ID 108 to generate an encrypted output 120. Therefore, as shown in FIG. 1, in the above exemplary scenario, the original data 106, e.g., "Happy New Year" is transformed into the encrypted output 120, e.g., "Y$9#72!AG4", which is undecipherable to persons who do not have knowledge of the encryption CBK used to encrypt the original data.

Subsequently, the exemplary encrypted output "Y$9#72!AG4" is processed by the CBSS client module 102A (sender) and reinserted into the expecting third party application program (e.g., a web-browser program as discussed above) in the sender's computing device. (Details of the steps involved in reinsertion of the encrypted output 120 and other associated processing will be discussed in connection with FIG. 7). Then, the sender's computing device transmits (at step 6) the encrypted output across one or more networks 110 to a social media system 118. It will be apparent to one skilled in the art that in alternate embodiments (not shown in FIG. 1), the encrypted output can be transmitted to any third party system, service, or provider. The social media system 118 in the scenario illustrated in FIG. 1 is simply an example of such a third party system, service, or provider. Alternately, in many scenarios, a sender (i.e., the CBSS client module 102A) can directly transmit a sender's communication (email message, text message, chat, or any other data or files) directly to an CBSS client module 104B (recipient) without involvement of a third party system, service or provider, as will occur to one of ordinary skill in the art.

Continuing with the description of FIG. 1, consequently at step 7, a recipient receives the sender's communication. Particularly, a recipient's computing device (or, a program such as a web-browser installed therein) communicates with the social media system 118 and views/receives the encrypted output 120, e.g., "Y$9#72!AG4" as illustrated in FIG. 1. In the next steps, a CBSS client module 104B in a recipient's computing device processes the encrypted output 120 for purposes of recovering the original data 106 from the encrypted output 120. (As will be understood, this implies that the CBSS client module 104B processes the encrypted output before rendering to the recipient visually and/or in an otherwise perceptible manner via a respective application program.) Therefore, at step 8, the CBSS client module 104B un-concatenates the encrypted output 120 to separate the CBK ID 108 and the encrypted version of original data 109, thereby generating the encrypted version of original data 109. (It will be recalled that previously at step 5, the CBSS client module 102A (sender) had concatenated the CBK ID 108 and the encrypted version of original data 109 to generate the encrypted output 120.)

It will be understood that the encrypted version of the original data 109 is still in an un-decipherable form, and recipients who are authorized by policies created by the sender (or, system administrators) will be allowed access to the original data. Thus, at step 9, the CBSS client module transmits a query to the server module 150, requesting the encryption CBK 107 that was used to encrypt the sender's original data 106 earlier at step 4 previously. According to one aspect, the query from the CBSS client module (recipient) to CBSS server module 150 comprises the CBK ID 108 that was extracted (previously at step 8) from the encrypted output 120.

In accordance with aspects of this disclosure, if the CBSS server module 150 determines that the CBSS client module 104B is authorized to access the original data based on pre-defined policies or access rights, then the CBSS server module 150 provides the encryption CBK 107 to the CBSS client module 104B at step 10. Details of the CBSS server module process steps will be discussed in connection with FIG. 10. After receiving the encryption CBK 107, the CBSS client module 104B decrypts (at step 11) the encrypted version of original data 109 to generate the original data 106 (e.g., "Happy New Year") at step 12. In one aspect, the CBSS integrates the original data 106 into an appropriate position inside the expecting third party application programs or software (e.g., at a specific location in a page or a document as applicable in web-browsers, email programs, mobile apps or any other external programs) in an unaltered manner having an identical "look and feel" to the original data, as expected by the expecting third party application programs or software.

Although not shown specifically in FIG. 1, some embodiments of the CBSS (e.g., with the help of functionalities of the KAAP server) provide an audit trail of any kind of communication/transaction involving CBSS client modules. Information included in the audit trail includes (but is not limited to) details identifying the sender's computing device, the recipient's computing device, date/time when a query was received corresponding to encryption (e.g., as shown in step 2 of FIG. 1), and/or decryption (e.g., as shown in step 11 of FIG. 1), the associated application programs at issue, and various other details. It will be appreciated that the audit trail of any kind of communication from client modules is helpful in different scenarios, e.g., financial services, healthcare, insurance, military defense, and many others.

The discussions above in association with FIG. 1 merely provide an overview of an embodiment of the present system for securing or encryption a communication and/or information between a sender and a recipient involving a third party service (e.g., a social media system), and is not intended to limit in any way the scope of the present disclosure. Also, multiple recipients can be involved in a cryptographic communication e.g., in one-to-many scenarios. In such scenarios, every recipient may have respective CBSS client modules running on their respective computing devices, constructed in accordance with aspects disclosed herein. If such client modules are not present on certain users' (recipients') devices, then those users will be unable to unencrypt or decipher the secured data. Furthermore, it will be also understood that senders or system administrators may predefine access control policies that govern the rights of recipients in being able to access the entire instance of a sender's original data, (or, a portion of the sender's original data) using certain types of software programs.

In alternate embodiments, a sender can communicate directly with a recipient without involving a third party service, system, or provider, e.g. chat/text/multimedia messages sent by a sender to a recipient. In another embodiment (not shown in FIG. 1) but in accordance with the present disclosure, the CBSS facilitates securing documents or other electronic data that are locally saved in a user's computing device or are saved in a system-wide database by providing functionalities associated with "at-rest encryption". In other words, the CBSS may secure data (or, more precisely, original data) that does not travel through any type of communication network, but instead is locally saved in an un-decipherable manner inside the user's computing device or database. Examples of such data include a user's social security number, health records, financial data and several other personal information attributes of users. It will be appreciated by one skilled in the art that in scenarios wherein the CBSS provides functionalities of at-rest encryption, the CBSS client module inside a user's computing device operates in a dual role—operating as a "sender" during an encryption process (i.e., transformation of original data into encrypted output), and subsequently as a "recipient" during a decryption process (i.e., reverse transformation of encrypted output back into original data). Therefore, aspects of CBSS client modules in cryptographic communication (e.g., involving senders' perspectives and recipients' perspectives) as disclosed herein can also be applied to CBSS embodiments that provide functionalities of at-rest encryption. Various architectural details of an embodiment of the disclosed CBSS will be described next in greater detail.

FIG. 2 illustrates an exemplary system architecture 200 of the CBSS 116 according to one embodiment of the present system, involving various modules and system components. The functions and operations of these exemplary modules and system components are described in greater detail below. As shown, in one scenario, cryptographic communication involves a sender 102 and a recipient 104. In such scenarios, the CBSS 116 includes one or more CBSS databases (alternately referred to herein as KAAP databases 114), CBSS server modules 150, and CBSS client modules 102A (sender) and 104B (recipient) comprising a plurality of software modules, processes, sub-routines or generally, algorithms operated by the CBSS, both at the server as well as at the clients. CBSS client modules 102A and 104B generally reside inside sender and recipient computing devices, respectively. As will be further understood, CBSS databases can reside not only on the server (as shown in FIG. 2) but also inside a user's computing device. CBSS client modules can have access to CBSS client databases in addition to volatile and non-volatile memory (e.g., RAM, hard drive, external drives, flash memory, etc.) associated with user computing devices. As recited previously, CBSS client modules 102A and 104B running on sender's and recipient's electronic devices (e.g., desktop computers, laptop computers, tablet PCs, or any other device capable of accessing the world wide web) are proprietary software programs (e.g., plugins) that run as background processes (i.e., in an "always on" operating mode).

Generally, the CBSS client modules are preconfigured so as to integrate with and operate seamlessly for every application program/software running on user computing devices. In one embodiment, configuration software is generated for all commonly-used application programs such that embodiments of the CBSS client modules run according to a user-friendly plug and play mechanism. If a new application program is identified for which the CBSS has not been configured to interact, the CBSS can be modified such that it detects information from and interacts with the identified application subsequently.

In the specific embodiment shown in FIG. 2, a CBSS client module 102A comprises a detection engine 206, an end-point engine 208, a reinsertion engine 210, and a user's computing device database 212 that stores information locally on the device or within the client module. In the same embodiment, it is also shown that the CBSS client module 104B (recipient) comprises an end-point engine 208, a reinsertion engine 210, and a user's computing device database 212. In what follows below, reason(s) explaining why some CBSS embodiments may not include the detection engine 206 (described in connection with FIG. 5) are provided. Generally (and as described elsewhere herein), client modules 102A and 104B can perform the same or similar processes when each module acts in a sending or receiving capacity. Specifically, in one instance, the module 102A might receive and decrypt certain original data that is encrypted by module 104B, and vice versa.

As will be understood from the descriptions subsequently herein, in one embodiment, the detection engine 206 performs the task of detecting user interaction with a computing device. (Further details regarding detection of original data are provided elsewhere herein.) For cryptographic communications involving multiple users, at any given snapshot of time, there may be one sender and one or more recipients. Thus, in embodiments wherein a user is a recipient, a detection engine is not required as recipients typically do not have to input any kind of data into their respective computing devices. Nevertheless, it will be understood by one of ordinary skill that a user who is a recipient at one time instant can be a sender of a communication at another instant of time. In alternate CBSS embodiments wherein multiple users attempt to send information simultaneously, information from multiple users is queued up and disseminated systematically according to some predetermined manner.

As will be generally understood, in one embodiment, the functions of the end-point engine 208 depend on whether the CBSS client module operates as a sender or as a recipient. Inside a sender's computing device, the end-point engine 208 performs the tasks of encrypting the original data 106 input by the sender. On the other hand, inside a recipient's computing device, the end-point engine 208 performs the task of decrypting the encrypted output 120 to extract the original data 106. Additionally, the end-point engine 208 is also typically involved in transmitting queries and receiving responses to and from the server module 150. It will be recalled from the previous discussions in connection with FIG. 1 that the CBSS client module can function both as a sender as well as a recipient in many scenarios, e.g., scenarios wherein the CBSS provides functionalities of at-rest encryption. Additional details of processing steps followed in an embodiment of an end-point engine indicating sender and recipient perspectives will be explained in connection with FIGS. 6 and 8 respectively.

Still referring to FIG. 2, in one aspect, the reinsertion engine 210 receives (or retrieves) the outcome of the processing performed by the end-point engine and integrates the outcome into an appropriate position inside the expecting third party application in an unaltered manner. This generally means that inside a sender's computing device the reinsertion engine 210 inserts the encrypted output 120 into the expecting third party application program, whereas inside a recipient's computing device, the reinsertion engine 210 inserts the original data 106 into an appropriate position (e.g., proper dialog box, row, column) in the expecting third party application program.

As also shown in FIG. 2, the CBSS client modules have operative connections via networks 110 with CBSS server modules 150, the CBSS server modules 150 further comprising one or more exemplary KAAP modules 112, and one or more exemplary KAAP databases 114. In one embodiment, the KAAP database 114 comprises a session table 258 (discussed exemplarily in FIG. 11) and other data tables (not shown in FIG. 2), as will occur to one skilled in the art. It will be understood and appreciated that the specific modules and databases in FIG. 2 are shown for illustrative purposes only, and embodiments of the present system are not limited to the specific architecture shown. For example, functionalities of the detection engine 206, the end-point engine 208, and the reinsertion engine 210 can be combined into a single or even multiple module(s), possibly with other functionalities as will occur to one of ordinary skill in the art. Even further, various other information can be stored in the CBSS (KAAP) databases 114, and are not limited to the ones described herein. In what follows next, several steps and functionalities (performed by the CBSS modules) and terminologies associated therewith will be explained.

FIG. 3 illustrates an exemplary schematic 300 showing certain steps and functionalities performed in an encryption process involving processing at CBSS client and server modules, according to one embodiment of the present system. It will be understood and appreciated by one skilled in the art that aspects of the encryption process are applicable to CBSS embodiments involving at-rest encryption functionalities as well as cryptographic communication functionalities, as discussed at various places in this disclosure. As shown in FIG. 3, within the CBSS client and server modules, various steps are annotated with the letter "f" indicating a computational algorithm, or a function.

From the previous discussions, it will be understood that the information security, as provided by CBSS embodiments, generally include aspects of two components—CBSS client modules running on user computing devices in conjunction with CBSS server modules running in a physical server located inside a facility or in a virtual server operating remotely. As shown and labeled in FIG. 3, the vertical schematic steps typically correspond to processing performed in CBSS servers, whereas the processing steps performed by the CBSS clients are generally indicated horizontally.

The CBSS server module typically begins processing when it receives a query from an CBSS client module, i.e., applicable generally to both senders and recipients. Typically, the query corresponds to a request from a user (via a client module) to encrypt some type of original data that is to be used in a communication, or stored in a database, or otherwise secured. The request typically includes information relating to the query-transmitting user (e.g., a user ID), the application program(s) for which the encryption is requested, a session ID corresponding to a time instance when the query was transmitted (or a time period during which the query is transmitted or when the original data was entered or provided to the application program at issue), as well as various other types of information as will occur to one of ordinary skill in the art.

As will be recalled from the previous discussions and those that follow later herein, aspects of the present disclosure relate to providing information security via context-based keys for encryption of data. Specifically (and in one embodiment, the keys are generated based on information retrieved from the parameters of the environment/framework wherein the data is generated, such that each key is unique for the particular data item being secured or encrypted. Thus, generally, context-based keys are "dynamic" keys dependent on exemplary parameters as described above, and that may change from one user session to the next.

In addition to "dynamic" keys, certain embodiments of the CBSS also rely on the usage of "static" hard-coded keys that are fixed keys which do not change. As will be understood, aspects of the CBSS can reuse such "static" keys multiple times across multiple user sessions, multiple users, multiple application programs, or any other permutations/ combinations of the above. Thus, in several CBSS embodiments, encryption CBKs 107 (or, equivalently CBK IDs 108) may comprise a combination of "static" as well as "dynamic" context-based keys to enhance overall security aspects. For example, to provide enhanced or robust security, it is desired in some embodiments to provide lengthy or complex keys. However, generating and storing such lengthy or complex keys often requires significant computing and/or processing capabilities. Thus, in one embodiment, each CBK is a combination of previously-used ("static") keys and additional information, such as a user ID, session ID, or other random key number/parameter. In other embodiments, each CBK is entirely unique and does not comprise any prior-used information. Further, in one exemplary aspect, previously created "dynamic" keys can even be reused as "static" keys. In another exemplary aspect, the "static" keys can be referred to as "session CBKs" (i.e., CBKs relating to prior user sessions that are repurposed as a portion of a new CBK). It will be understood and appreciated to those of skill in the art that each CBK may comprise a variety of types of information, so long as each CBK is unique to the specific data being secured or encrypted. Aspects of CBKs as described herein are provided for illustrative purposes only and are not intended to limit the scope of the present disclosure in any way.

Generally, encryption CBKs generated during an exemplary encryption process are used again during a subsequent decryption process, typically at a recipient's client module 104B. However, as discussed previously, in various scenarios, e.g., when the user desires functionalities of at-rest encryption, a user is first a sender during encryption and then also becomes a recipient later during decryption. Furthermore, it will also be understood that decryption is generally considered a reverse of an encryption process, and details of a decryption process will be apparent to one skilled in the art from the discussions provided herein. Therefore, a schematic for a decryption process in not discussed herein.

Still referring to FIG. 3, after receiving a query from a user (sender) who requests encryption, the CBSS server modules extract an exemplary user ID, a session ID, and other details from the query. As discussed previously, in some embodiments, the "query" from the user (or the user's application program) is not necessarily an affirmative request for encryption from the user, but rather is an indication from the application program or an identification by the client module 102A that some data has been entered into the application program for which encryption is desired. After receiving the query, the CBSS server creates a string, also referred to herein as CBK ID 108, by concatenating one or more session CBKs (e.g., static keys, as explained above), a user ID, and a session ID. In other embodiments, the CBK ID need not necessarily include a user ID, session ID, or the like, but may include some other unique and/or identifying information that will be used to encrypt the particular data element. This string is next provided as input into an encryption algorithm 320 such as SHA 256, or MD5, or any other encryption algorithm as will occur to one skilled in the art. CBSS embodiments do not impose any form of limitations in the selection of encryption and/or decryption algorithms.

In one CBSS embodiment, the CBSS server modules 150 extract the first 32 bits of the 64 bit output generated by SHA 256. These 32 bits, in the present disclosure, is referred to as encryption CBK 107. Typically, a CBK ID 108 uniquely identifies a corresponding encryption CBK 107, via a one-to-one mapping, as will occur to one skilled in the art. Again, the CBK 107 is not limited to the specific exemplary discussions herein, and may comprise some other portion of bits, numerals, or the like that will comprise the key used to encrypt the at-issue original data. Subsequently, the encryption CBK 107 and the CBK ID 108 are saved in databases associated with the CBSS servers. Next, if pre-defined access control policies (as specified by system administrators and users) are satisfied, the CBSS servers respond back to the CBSS client module with the encryption CBK 107 and the CBK ID 108. (Exemplary pre-defined access control policies are provided in connection with FIG. 12.) In turn, the CBSS client module then utilizes the encryption CBK 107 and the CBK 108 for the encryption process, as explained below.

As shown in the embodiment of FIG. 3, the CBSS client module 102A utilizes the encryption CBK 107 along with the original data 106 as an input to an encryption algorithm 330, e.g., AES, or any other such algorithm. As will be understood, according to exemplary aspects, the encryption/decryption algorithms running in the CBSS client modules can be selected independently of the encryption/decryption algorithms running in the CBSS server modules. This, as will be appreciated by one skilled in the art, allows for a modular architecture. Also, as shown in FIG. 3, according to an aspect of the present disclosure, the original data typically does not leave its point of genesis (e.g., a user's computing device) in an unencrypted form. This aspect provides greater protection to the original data by preventing it from being compromised during its passage over different types of communication networks. Additionally, CBSS embodiments are also applicable to environments wherein bandwidth is scarcely available.

Typically, the output of the AES algorithm 330 (or, any other encryption algorithm) at the CBSS client module is an un-decipherable form of data, referred to herein as the encrypted version of original data 109. Next, the CBSS client module concatenates (using an append function 340) the CBK ID 108 to the encrypted version of original data 109, thereby generating the encrypted output 120. As will be recalled, the CBK ID 108 and the encryption CBK 107 were obtained previously in a response from the CBSS server module. Further, it will be understood that in one exemplary aspect, the CBK ID 108 (that is included in the encrypted output 120) will be extracted and later used (as authorization credentials) by a recipient to request the CBSS server modules for the encryption CBK 107 corresponding to the respective CBK ID 108. If the CBSS server modules are able to successfully authorize (based on pre-defined user access policies, and other qualifying factors) the request from the recipient, then the CBSS server module provides the respective encryption CBK to the recipient. Details of the CBSS server processing will be explained in connection with FIG. 10.

From the above discussions, it will occur to one skilled in the art that CBSS embodiments that provide information security using encryption CBKs (as described above) are generally applicable to original data that is based on textual content. In many scenarios, CBSS embodiments may need to provide information security to various types of original data that are not text-based, e.g., images and videos. In such scenarios, the CBSS generates an image-based encryption CBK that generally has the appearance of bar codes or QR codes. For such encryption CBKs, the CBSS extracts the RBG (or, equivalently grayscale) pixel information, manipulates that information using specific details of session ID, user ID, application ID, etc., re-encodes the manipulated pixel information into image files or video files, and finally transmits the re-encoded image file or video file back to CBSS client modules. Described next is a high-level overview of processes running generally inside CBSS client modules 102A and 104B for encryption and subsequent decryption of original data.

Turning now to FIG. 4, a flowchart representing a high-level process 400 of provision of information security performed by various modules and software components that comprise an embodiment of the CBSS client module is shown. Details of steps performed by individual software components are explained in FIGS. 5-10B. It will be generally understood that in the embodiment shown in FIG. 4, the CBSS client module processes are shown as running inside both senders' and recipients' computing devices, unless specifically stated otherwise. As will be further understood and appreciated, the steps of the process 400 shown in FIG. 4 may operate concurrently and continuously, are generally asynchronous and independent, computer-implemented, tied to particular machines (including various modules/engines of the CBSS 116 and its components), and not necessarily performed in the order shown.

Starting at process 500, the CBSS 116 (particularly, the detection engine 206) performs the task of detecting user entry of information, a user's inputs, or some other indication from a user that data should be encrypted via his or her computing device. For example, the CBSS 116 can detect mouse movements, joystick movements, keyboard entries, voice-based commands, hand-gestures, or any other form of conceivable user input into an application program and/or hardware. Thus in embodiments wherein a user is a recipient, a detection engine is not required as recipients typically do not have to input any kind of data for encryption into their computing devices. Therefore, in the process shown in FIG. 4, it is assumed that the detection engine process usually runs in a sender's computing device. Details of an exemplary detection engine process are discussed in connection with FIG. 5.

It will occur to one skilled in the art that in many scenarios, several types of user inputs need not be encrypted. Examples of such user inputs might include general search queries entered by users, date/time data entered by users, and the like. Therefore, in many aspects, the detection engine 208 functions as a "decision engine" that uses predetermined and intelligent logic to determine whether or not user inputs need to be secured. Further, as will be understood, in embodiments wherein users or system administrators do not wish to secure their data, CBSS client modules (or server modules) can toggle off provision of data security. However, as will be understood by one skilled in the art, in certain embodiments, one cannot toggle off previously performed encryption on original data (i.e., the previously-encrypted data will remain encrypted).

As shown via sub-processes 600 and 800 in FIG. 4, the end-point engine process (in a sender's computing device) retrieves from the user's computing device the original data 106 that is to be encrypted and transmits a query to the server module(s) requesting one or more context-based keys (e.g., encryption CBK(s)) that will be used in an exemplary encryption process. On the other hand, the end-point engine process (in a recipient's computing device) retrieves from the user's computing device the encrypted output 120 that is to be decrypted and transmits a query to the server module(s) requesting context-based keys that will be used in decryption. It will be understood that according to aspects of the present disclosure, in an exemplary decryption process, the CBSS client module uses the same context-based keys as that used for encryption.

For ease of understanding of the discussions in this disclosure, general definitions of various terms used herein have been provided in the glossary above and in the description relating to FIG. 3. Detailed steps of an exemplary end-point engine process from senders' perspectives and recipients' perspectives are provided in connection with FIGS. 6 and 8.

Still referring to FIG. 4, the outcome of encryption/decryption as performed by an exemplary end-point engine in a sender/recipient's computing device is next processed via sub-processes 700 and 900 by an exemplary reinsertion engine 210. For example, the reinsertion engine receives (or retrieves) the outcome of the processing performed by the end-point engine and integrates it into an appropriate position inside the expecting third party application in an unaltered manner. This means that inside a sender's computing device the reinsertion engine inserts the encrypted output 120 into the expecting third party application program, whereas inside a recipient's computing device, the reinsertion engine 210 inserts the original data 106 into an appropriate position. As will be understood, an appropriate position can be, for example, a dialog box, a row/column (or any other position), a data entry field, an image posting field, a portion of text, or any other predetermined location or field in the expecting third party application program.

Although the discussions in connection with several CBSS client modules (e.g., in FIGS. 1, 2, 5, 6, 8, and other places in this disclosure) do not specify a particular step of flushing memory storing intermediate variables/data, it will be apparent to one skilled in the art that CBSS embodiments can be designed to periodically flush or delete such data for privacy purposes, if such data is stored in non-volatile memory.

It will be further appreciated by one skilled in the art that functionalities of the detection engine can be leveraged regardless of the end-point engine process, e.g., in scenarios wherein at-rest encryption functionalities are desirable. Additionally, in such scenarios, the CBSS also optionally allows users to review audit trail(s) of any kind of communications/transactions between CBSS client and server modules, as mentioned previously. Further details of CBSS server steps pertaining to generation of audit trails and other steps will be provided in connection with FIG. 10. In what follows next, processing steps in an exemplary detection engine 206 running in a sender's client module 102A are discussed.

Now referring to FIG. 5, an exemplary detection engine process that is running on senders' computing devices is shown. At step 502, the detection engine process probes the hardware and software in a user's computing device to extract original data 106 corresponding to a user's interactions with a user's computing device and/or connected peripheral device(s) and/or application programs operating on such devices. Examples of software in a user's computing device that may be probed include (but are not limited to) HTML source code, image files, audio files, multimedia files, all file systems related to the operating system (OS) running on the user's computing device, Internet browsers, electronic document applications, and various other sources. Examples of hardware relating to users' computing devices include volatile memory (RAM), hard disk drives, etc. In one embodiment, hardware associated with user computing devices registers mouse movements, joystick movements, keyboard entries, voice-based commands, human gestures, or any other form of conceivable user input to indicate original data being entered or accessed within an application program.

Some aspects of the detection engine can be real-time (or, virtual real time) while others can be event-based. The detection engine, for example (and in one embodiment), tracks (probes) real-time movements of the cursor, joystick, feed from hardware, memory etc. corresponding to any form of user interactions in order to extract original data. An example of event-based aspect include events that involve a user inputting text into a box in a user interface (UI) application. The detection engine is aware that the user is presently interacting with the box, although it may not be aware of the original data that the user is inputting. The detection engine, in one embodiment, is not aware of the original data until the user, for example, has clicked on a UI menu or button indicating that he or she has completed inputting text. Such interaction by the user with a field or button within the UI may provide an indication to the CBSS that information has been entered into the computing device, and such information should be encrypted.

In other scenarios, the detection engine may detect the need for encryption of original data via movement-based or time-based processes. For example, embodiments of the CBSS 116 may simply define segments of original data as the data being entered in periodic time intervals (e.g., every second, or 10 seconds, or 10 minutes, etc.), and will accordingly encrypt such data that has been entered or saved into the computing device during that time interval with a unique context-based key. Alternatively, the detection engine (at steps 502 and 504) may detect instances in which a user has stopped keying information or moving a cursor for a predetermined period of time. For example, if a user was typing into an application program virtually continuously for a period of time, and then stopped interacting with or typing into the application program for a predetermined time period (e.g., 5 seconds), then the detection engine may define the information that was entered via the continuous typing session as a discrete item of original data that should be encrypted. Aspects of the CBSS may also detect movements in certain parts of a user interface by a cursor or control mechanism, and will rely on those movements to indicate a need for data to be encrypted. As will be understood and appreciated, by tracking and identifying user interaction with various UIs and application programs, the CBSS is able to automatically identify when certain items of data should be encrypted or secured, and is similarly able to segment or partition the items of data according to predefined business rules or logic.

It will be understood by one skilled in the art that CBSS client and server modules can be coded using event-driven languages (e.g., Java). These languages generally allow UI type applications wherein users typically review an interface containing components such as controls, buttons, menus and other graphical elements. Thus, aspects of the CBSS coded using such event-driven languages allow the system to respond to events that are generated by the various components of the application, both in response to user interactions and other system components such as client-server processing. Moreover, it is also well known to one skilled in the art that there are a finite number of ways that a user input can be rendered in a web browser, or any other application program/software. Therefore, aspects of the CBSS detection engine are designed to track such user inputs, and are further described below.

Typically, in UI applications, users interact with the controls to make something happen. For example, a user may click a button, or choose a menu item. Whatever users choose to do, they will initiate an event, which in turn, initiates a program, module, or code in an event-handler, which is a part of the detection engine coded to respond to the specific event. According to aspects of the present disclosure, the event-handler informs the CBSS (e.g., detection-engine 208) about handling the event, and thereafter the CBSS usually waits for the user to do something else. It will be additionally understood that the CBSS extracts information from the event-handler based on the specific application or based on the contents and UI components of the specific page. Examples of such "events" that can be identified include user interactions such as clicking "submit" or "save" buttons, or "post" or "like" buttons on FACEBOOK™ pages, or "send" indications in connection with email communications, etc.

Still referring to FIG. 5, at next step 504, the CBSS determines whether or not the original data 106 needs to be encrypted. In other words, in many scenarios, several types of user inputs need not be encrypted. Examples of such user inputs include general search queries entered by users, date/time data entered by users, and the like. Therefore, in many aspects, the detection engine 208 functions as a "decision engine" in determining whether or not user inputs need to be secured. These decisions are generally based on predetermined rules or logic that identify when certain information should or should not be encrypted.

If the CBSS determines that the original data does not need to be encrypted, then the process returns to step 502, and the entire detection engine process is retriggered. However, if the CBSS determines that the original data needs to be encrypted, then the process moves to step 506 wherein the CBSS diverts the flow of original data, and saves (at step 508) the diverted original data into a secured location in volatile/non-volatile memory, hard disk drive etc., bypassing the flow of the original data into the expecting application program. The original data is temporarily diverted from being utilized by the respective application program such that the data can be encrypted or otherwise processed via an embodiment of the CBSS 116. Depending on the specifics of software implementation, the original data extracted in step 502 can be in discrete chunks of limited size, and therefore, the CBSS might need to continue the detection process further. Thus, the CBSS determines at step 510 whether or not to continue detection. Accordingly, the CBSS process reverts back to step 502, or, ends thereafter. Further processing of the saved (diverted) original data as performed by an end-point engine, is described next.

Turning to FIG. 6, an exemplary end-point engine process 600 is shown for encrypting the original data detected from a user's computing device, according to one embodiment of the present system. The process 600 shown in FIG. 6 is shown from the perspective of CBSS client modules running on sender computing devices. Starting at step 602, the CBSS client module retrieves original data 106 from volatile/non-volatile memory in a user's computing device. It will be recalled that an instance of the original data input by a sender was diverted from the expecting application program, and saved inside databases associated with a sender's computing device (or some other data storage means) by an exemplary detection engine process, as discussed previously in connection with FIG. 5. Then, after retrieval of original data, the CBSS client module transmits (at step 604) a query for encryption to CBSS server modules 150 via networks 110. Typically, the CBSS query is transmitted via a secure communication protocol (e.g., SFTP, SSH, etc.). Next, the CBSS server modules receive the query and respond back to the CBSS client module at step 606. (Details of steps included in CBSS server module processing will be discussed in connection with FIG. 10.)

In one CBSS embodiment, the query (of step 604) comprises a user ID, a session ID (e.g., generated by the CBSS client module and identifying time instance of creation of new data), an application program ID corresponding to the expecting third party application program that the user (sender) was interacting with, and other relevant information to the server module 150. As will be understood from the discussions in connection with FIG. 10, CBSS server modules, in one embodiment, positively respond back (at step 606) to the CBSS client module with an encryption CBK 107 and a CBK ID 108, if the query transmitted at step 604 is valid (e.g., corresponds to a sender and an associated application program that are authorized to encrypt original data). Thus, at step 608, the CBSS client module determines whether or not the response received at step 606 comprises a positive acknowledgment (response).

However, if the CBSS client module (end-point engine) determines that the server modules have not responded (at step 608) positively, then in one embodiment, the encryption CBK 107 (refer to FIG. 3 for details) perhaps was not generated by the CBSS server module, and hence encryption can not be successfully performed at the CBSS client module. In one aspect, the CBSS client module reverts back to step 602, and the entire process is retriggered. In alternate aspects, the CBSS client module displays a message to the user indicating one or more reasons why the encryption could not be successfully performed, and the process exits thereafter (not specifically shown in FIG. 6).

Still referring to FIG. 6, if a positive acknowledgement is received from the server module(s) (via steps 606 and 608), then the CBSS client module parses (at step 610) the response received to extract the encryption CBK 107 and the CBK ID 108 pertaining to the particular item of original data to be encrypted. At step 612, the CBSS client module (e.g., the end-point engine process) encrypts the original data 106 using the encryption CBK 107 and an encryption algorithm to generate an encrypted version of the original data 109. An exemplary schematic to an encryption process is shown in FIG. 3. Additionally, in one embodiment, in step 614, the CBSS client module appends the CBK ID 108 to the encrypted version of the original data 109 to generate an encrypted output 120. It will be realized that both the encrypted version of the original data 109 and the encrypted output 120 are in a form un-decipherable to the human eye (e.g., ciphertext). Eventually, at step 616, the CBSS client module saves the encrypted output 120 locally in a database or memory in the user's (sender's) computing device. Depending on the specifics of software implementation, the original data 106 that is encrypted can be in discrete chunks of limited size, and therefore, the CBSS might need to continue the encryption process further. Thus, the CBSS determines at step 618 whether or not to continue encryption. Accordingly, the CBSS process reverts back to step 602, or, ends thereafter. According to aspects of the present disclosure, the CBSS client module eventually re-inserts the encrypted output for use by the respective application program. Details of such an insertion are described next.

Now referring to FIG. 7, an exemplary process 700 is shown for reinserting encrypted outputs into expecting application programs, as implemented by an embodiment of the reinsertion engine in an CBSS client module running on a sender's computing device. Starting at step 702, the reinsertion engine process 700 retrieves encrypted output 120 from a device database (or, volatile/non-volatile memory) in a user's computing device. Next, at step 704, the reinsertion engine processes the encrypted output 120 to correspond to an appearance and format as expected by a respective application program. The outcome of the processing (at step 704) is inserted into the respective application program at step 706. Subsequently (not shown in FIG. 7), the CBSS client module transmits the encrypted output to one or more recipients, or third party systems, via networks 110, and the process end thereafter.

Now referring to FIG. 8, an exemplary process 800 for receiving and decrypting an encrypted output, from the perspective of a recipient, as implemented in an CBSS client module (recipient), is described next. Starting at step 802, the recipient (or, the recipient's computing device) receives encrypted output 120. At next step 804, the CBSS client module parses the encrypted output to extract a CBK ID 108, and the encrypted version of original data 109. It will be understood that in one embodiment the CBSS client module (recipient) is aware of the relative positions occupied by the CBK ID 108 with respect to the encrypted output 120. For example, the CBK ID 108 might correspond to the last ten (10) bits or the first fifteen (15) bits of the encrypted output 120.

Next, in one aspect, the CBSS client module transmits a query (comprising the CBK ID along with information identifying the CBSS client module running in recipient's computing device) with an accompanying request for decryption, to the CBSS server module at step 806. In this particular embodiment, the CBK ID is the identifier that uniquely relates to the encryption CBK 107, details of the respective application program, and various other attributes, and allows the CBSS 116 to identify the appropriate key necessary to decrypt the relevant data item.

Typically, the CBSS query is transmitted via a secure communication protocol (e.g., SFTP, SSH, etc.). Generally, CBSS server modules receive the query and respond back with a reply, which is received at step 808 by the CBSS client module. (Details of steps included in CBSS server module processing will be discussed in connection with FIG. 10.)

As will be understood from the discussions in connection with FIG. 10, CBSS server modules, in one embodiment, positively respond back with an encryption CBK 107 if the query transmitted at step 806 is valid (e.g., corresponds to an authorized recipient along with an associated authorized application program that is authorized access to decrypt the original data). Thus, at step 810, the CBSS client module determines whether or not the response received at step 808 is a positive acknowledgment (response).

However, if the CBSS client module (end-point engine) determines (at step 810) that the server modules have not responded positively, then in one embodiment, this generally implies that the CBSS server module 150 has not provided the encryption CBK 107 that would have been utilized in a decryption process at the CBSS client module (recipient). For example, if the particular recipient is not authorized to view information or data provided by the sender (e.g., based on predetermined access rules, authorizations, or policies), then the recipient may be denied access to the data (and the corresponding CBK). In some scenarios, the CBSS server module provides one or more reasons related to the denial of the CBK. Thus, in one aspect, the CBSS client module displays (at step 811) a message to the user indicating one or more reasons why the decryption could not be successfully performed, and reverts back to step 802. Correspondingly, the end-point process exits thereafter.

If a positive acknowledgement is received from the CBSS server module(s), then the CBSS client module parses (at step 812) the response received to extract the encryption CBK 107 that will be utilized for purposes of decryption as described in the next step. At step 814, the CBSS client module (e.g., the end-point engine process) decrypts the encrypted version of the original data 109 using the encryption CBK 107 and a decryption algorithm to generate the original data 106. An exemplary schematic to an encryption process is shown in FIG. 3. Eventually, at step 816, the CBSS client module saves the original data 106 locally in a database or memory in the recipient's computing device. Alternatively, rather than data being saved locally, the original data is simply displayed to the recipient via a UI or other viewing mechanism. Depending on the specifics of software implementation, the CBSS might need to continue the decryption process further. Thus, the CBSS determines at step 818 whether or not to continue decryption. Accordingly, the CBSS process reverts back to step 802, or, ends thereafter. According to aspects of the present disclosure, the CBSS client module (recipient) eventually provides the original data 106 to the application program for use and/or display to the recipient. Details of such an insertion are described next.

Now referring to FIG. 9, an exemplary reinsertion engine process 900 is shown, as implemented in one embodiment of a CBSS client module running on a recipient's computing device. Starting at step 902, the reinsertion engine process retrieves original data 106 (obtained as an outcome of processing by the end-point engine) from a device database (or, volatile/non-volatile memory) in a user's computing device. Next, at step 904, the reinsertion engine processes the original data 106 to correspond to an appearance and format (e.g., font, position, etc.) as expected by a respective application program for eventual display to the recipient via a UI (or other subsequent use). The outcome of the processing (at step 904) is inserted into the respective application program at step 906. Subsequently, (not shown in FIG. 7) the CBSS client module transmits the encrypted output to one or more recipients, or, a third party application systems, via networks 110, and the process ends thereafter. Described next are exemplary CBSS server module processes.

Now referring to FIG. 10 (consisting of FIGS. 10A, 10B, and 10C), exemplary CBSS server module processes are shown and described, including steps involved in functionalities of key management, authorization/access control, and auditing and policy management, the functionalities abbreviated herein as "KAAP," and hence the CBSS server is also alternately referred to as a KAAP server. As will be understood and appreciated, the exemplary functionalities described above (and others) are flexible and user-friendly. Furthermore, the design of the CBSS server module is modularized such that that individual functionalities of the CBSS server module can be altered, regardless of the underlying data.

Starting first with FIG. 10A at step 1002, the CBSS server module receives a query from an CBSS client module (e.g., an end-point engine process running in a client's computing device) for encryption of a particular item or element of data. As discussed previously (e.g., in connection with FIG. 1 and FIG. 6), in one CBSS embodiment, queries are generally transmitted by CBSS client modules that wish to encrypt original data 106. Alternately, CBSS client modules can also transmit a query in connection with decrypting (e.g., as discussed in FIG. 8) an encrypted output 120. (A schematic of an exemplary encryption process has been described in connection with FIG. 3.) Usually, queries from CBSS client modules are transmitted via secure communication protocols such as FTP, SFTP, SSH, etc.

Next, at step 1004, the CBSS server module authenticates the credentials associated with the query. For example, the CBSS server module checks the query for source MAC/IP addresses, a user ID, a session ID, an application program ID, and various other details associated with the query (e.g., other contextual information). Thus, at step 1006, the CBSS server module determines whether or not the credentials of the query are authorized. In one embodiment, the credentials are authorized based on a check against a predetermined list or database of authorized information relating to particular system users, computing devices, enterprises, or other information. As will be understood and appreciated, credentials and authorization can be provided in a variety of ways.

If the CBSS server module determines (at step 1006) that the credentials of the query are authorized, then the CBSS server module moves to the next step 1008 in which it determines whether the query was for encryption or decryption. Accordingly, the process moves to step 1010 (shown in FIG. 10B), or step 1028 (shown in FIG. 10C), respectively. In alternate embodiments (not shown herein), the CBSS server module can receive queries from CBSS client modules for various other reasons besides encryption or decryption. Such reasons can include (but are not limited to) a request for access to a new type of application software, a request for an audit trail, a change in user policies, and other similar requests.

Referring now to FIG. 10B, at step 1010, the CBSS server module parses the query (received at step 1002 from the CBSS client module) to identify details (i.e., contextual information) related to the query, e.g., an application program/software, a user, a time stamp of the query or data entry, a geographical location at which the query originated, etc. As will be understood, in many CBSS embodiments, a user's password, a user's computing device ID, a session ID along with various other details can be integrated into a query. Generally, these details and information provide a description of the contextual environment within which the data that is to be encrypted or secured has been created or accessed. Then, the CBSS server generates (at step 1012) a string, also referred to herein as CBK ID 108, by concatenating one or more session CBKs (i.e., static keys that usually do not change, and that have been explained in greater detail in connection with FIG. 3), a user ID, and a session ID. Again, the particular format of the CBK and CBK ID described herein are provided for illustrative purposes only, and are not intended to limit the scope of the present disclosure in any way.

At step 1014, the CBSS server modules retrieve from CBSS databases predefined access control policies dependent on various factors, e.g., for respective user and for respective application program. As will be understood, rules/policies govern the rights of users in being able to access data and/or associated software programs in order to achieve information security. Examples of associated software programs include (but are not limited to) database access systems, email systems, word processing software, document management software, messaging applications, multimedia applications, or, any kind of attachments present along with an email/MMS message, etc. Further, policies can be based on various conditions as will occur to one skilled in the art. Examples of such conditions include the role of the user from whom the query originated, the IP address/geographical location of the user, the time of the day at which the query originated, and various other parameters relating to the originating environment of the query. Exemplary policies will be discussed in connection with FIG. 12. In some CBSS embodiments (not shown herein), the CBSS server modules retrieve access control policies from third party systems or databases, including policy servers that store enterprise access control policies related to corporate organizations and entities. Then, the CBSS server modules determine at step 1016, whether or not access control policies are satisfied by the query (more particularly, from the information in the query).

If the CBSS server modules determine that access control policies are not satisfied, then, in one embodiment, the CBSS server modules transmit (at step 1018) a message to the respective CBSS client module indicating the same from which the query originated. Subsequently, to generate an audit trail of the at-issue (and denied) transaction with the CBSS client module, in one embodiment, the CBSS server module stores (at step 1026) metadata corresponding to the transaction in an exemplary CBSS database, and the process 1000B exits thereafter.

Alternately, if the CBSS server modules determine that access control policies are satisfied, then, in one embodiment, the CBSS server module saves (i.e., creates a database entry) the CBK ID 108 in a database associated with the CBSS servers, at step 1020. In the nest few steps, the CBSS server module generates an encryption CBK 107.

First, at step 1022, the CBSS server module provides the CBK ID 108 as input to an encryption algorithm (e.g., SHA 256, or MD5, or any other encryption algorithm) and an intermediate output is generated. Depending on the encryption algorithm used, in one CBSS embodiment, the CBSS server modules perform further processing on this intermediate output. For example, the CBSS server module might extract the first 32 bits of the 64 bit output generated by SHA 256. These 32 bits, in the present disclosure, are referred to as the encryption CBK 107. Subsequently, the encryption CBK 107 is also saved (not shown in FIG. 10B) in databases associated with the CBSS servers. Next, the CBSS servers respond back to the CBSS client module with the encryption CBK 107 and the CBK ID 108 at step 1024. Additionally, in one embodiment, the CBSS server module stores (at step 1026) metadata corresponding to this transaction with the CBSS client module in an exemplary CBSS database, and the process exits thereafter.

As mentioned previously, after receiving the encryption CBK 107 and the CBK ID, the CBSS client module 104A (specifically, the end-point engine 208 in the sender's computing device) uses the encryption CBK to encrypt the original data 106, thereby generating an encrypted output 120 as discussed earlier in connection with FIG. 1 and FIG. 6. In one aspect, the CBSS client module (specifically, the reinsertion engine 210) integrates the encrypted output 120 in an appropriate position inside the expecting third party application programs or software (e.g., web-browsers, email programs, mobile apps or any other external programs) in an unaltered manner having an identical "look and feel", e.g., visually and/or otherwise, as expected by the expecting third party application programs or software. Such details have been discussed in connection with FIG. 1 and FIG. 7.

Still referring to FIG. 10, it will be recalled that at an earlier step 1008 (shown in FIG. 10A), the CBSS server module determines whether or not the query received (at step 1002) from the CBSS client module corresponds to a request for decryption. Therefore, now referring to FIG. 10C, at step 1028, the CBSS server module parses the query to identify details related to the query, e.g., an application program/software, a user, a time stamp of the query or data entry, a geographical location at which the query originated, a CBK ID etc. It will be recalled from the previous discussions (e.g., in connection with FIG. 1 and FIG. 8) that a query involving a request for decryption from an CBSS client module (recipient) generally comprises a CBK ID 108. As will be understood, in many CBSS embodiments, a user's password, a user's computing device ID, a session ID along with various other details can be integrated into a query. At step 1030, the CBSS server modules retrieve from CBSS databases predefined access control policies dependent on various factors, e.g., for respective user and for a respective application program, etc. Details of conditions and factors that are included in pre-defined access control policies were discussed earlier in connection with FIG. 10B and will again be discussed in connection with FIG. 12. As an example, a policy could indicate that in an enterprise social network, a specific set of users may review posts by other users. Even further, another policy could indicate that the specific set of users who wish to review posts by other users have to be connected to the corporate LAN while reviewing the posts. Many other such policies may be defined, as will occur to one of ordinary skill in the art.

If the CBSS server modules determine (at step 1032) that access control policies are not satisfied, then, in one embodiment, the CBSS server modules transmit (at step 1034) a message to the respective CBSS client module from which the query originated. Subsequently, to generate an audit trail of this transaction with the CBSS client module, in one embodiment, the CBSS server module stores (at step 1040) metadata corresponding to this transaction in an exemplary CBSS database, and the process exits thereafter.

Alternately, if the CBSS server modules determine (at step 1032) that access control policies are satisfied, then the CBSS server module retrieves (at step 1036) the encryption CBK 107 corresponding to the particular item of original data (based on the CBK ID) from an exemplary database associated with the CBSS servers, at step 1036, and transmits (at step 1038) the encryption CBK 107 to the respective CBSS client module from which the query was originally received (e.g., step 1002 in FIG. 10A). Additionally, in one embodiment, the CBSS server module stores (at step 1040) metadata corresponding to this transaction with the CBSS client module in an exemplary CBSS database, and the process exits thereafter.

As mentioned previously, after receiving the encryption CBK 107, the CBSS client module 104B (specifically, the end-point engine 208 in the recipient's computing device) uses the encryption CBK to decrypt the original data 106 as discussed earlier in connection with FIG. 1 and FIG. 8. In one aspect, the CBSS client module (specifically, the reinsertion engine 210) integrates the original data 106 in the appropriate position inside the expecting third party application programs or software (e.g., web-browsers, email programs, mobile apps or any other external programs) in an unaltered manner having an identical "look and feel", e.g., visually and/or otherwise, as expected by the expecting third party application programs or software. This enables the user 104 to view, access, or otherwise utilize the original data as needed. Such details have been discussed in connection with FIG. 1 and FIG. 9 previously.

It will be understood that an embodiment of the CBSS server modules as described in FIG. 10 are provided for exemplary purposes only. Specific variations of the steps discussed herein can be performed according to various alternate embodiments, as will be apparent to a person skilled in the art. For example, after receiving a request for encryption from a CBSS client module, and before receiving a corresponding request for decryption, the CBSS server module can communicate with one or more third party agencies that provide behavior monitoring technologies in order to identify certain types of trends in the queries transmitted by users. Such communication with third party agencies, can be according to pre-defined business rules for corporate organizations and/or otherwise. Accordingly, the CBSS server modules waits for response from the contacted one or more third party agencies.

Further variations of the CBSS can include CBSS embodiments used for audit trails of transactions/communications between the CBSS client and server modules, without invoking functionalities of encryption or decryption. An exemplary scenario wherein this is applicable is when a corporate organization wishes to keep track of any kind of communication that is transmitted by its employees to non-employees, or even, those that require the communication to travel outside of the organizations' corporate LAN.

Turning now to FIG. 11, an exemplary session table 258 is shown displaying exemplary attributes associated with user sessions over a network 110, and stored in an exemplary CBSS server database. As shown, the session table 258 comprises attributes named User ID, Session ID, Encryption CBK, CBK ID, Policy ID, Application Program ID, and a Device ID. All of this information may comprise contextual information that is utilized in encrypting or securing individual items of data created or accessed within a given user's computing environment. For example, the User ID uniquely identifies a user associated with the CBSS, such a user being able to access data as defined in pre-created policies specified in the Policy ID column, and application programs/software as indicated in the Application Program ID column. Even further, users in the User ID column are allowed to access data and/or application programs via CBSS client modules running in computing devices as specified in the Device ID column. As mentioned previously, in one CBSS embodiment, session IDs are provided through queries transmitted by CBSS client modules to CBSS server modules. Further, in another CBSS embodiment and as shown in FIG. 3, CBK IDs are generated (at CBSS server modules) by concatenating User ID, Session ID, and Session CBKs (not shown in FIG. 11). Also, because every session corresponds to an unique instance of data, unique CBK IDs and correspondingly unique encryption CBKs (specified in the Encryption CBK column in FIG. 11) are generated.

For example, as seen from the data entries in table 258, a user identified as "User ID 01" is allowed access to "Application Program ID 31" on a device having "Device ID 62B". Policies associated with the user are listed in CBSS servers as "Policy ID 2A, 5B". Further, exemplarily, a session ID for a user session is indicated as "1A26", an encryption CBK 107 taking an arbitrary value "$79#2", and a corresponding CBK ID 108 taking another arbitrary value "1A26AG4". It will be recalled from the previous discussions that in one CBSS embodiment, the CBK ID is a string obtained from the Session ID and other information (e.g., refer to FIG. 3). Also, typically the encryption CBK is obtained as the output of an encryption algorithm that accepts the CBK ID 108 as an input. It will be understood by one having ordinary skill in the art, the session table 258 is presented for illustrative purposes only, and embodiments of the present system are not limited to use of data, information, and fields as shown herein. Described next are exemplary screenshots of CBSS embodiments.

Now referring to FIG. 12 (consisting of FIGS. 12A, 12B, and 12C) screenshots 1200A, 1200B, and 1200C respectively of exemplary CBSS embodiments are shown in connection with transmission of a cryptographic communication integrated with a third party application software program, from a sender's perspective. Specifically, FIG. 12A corresponds to the original data prior to CBSS processing, whereas FIG. 12B corresponds to an encrypted output generated as a result of CBSS processing, wherein both FIG. 12A and FIG. 12B correspond to instances prior to transmission of a cryptographic communication. Additionally, FIG. 12C displays exemplary screenshot 1200C that corresponds to an instance after transmission of the cryptographic communication, also from a sender's perspective. (Refer to FIG. 3 for an exemplary schema showing intermediate data and high-level operations relating to CBSS processing).

In the examples discussed herein, a sender (CBSS user) called "Tim Black" wishes to encrypt certain communications via an exemplary third party application software program called "Eyetext", which is a social media network (such as FACEBOOK™) or an enterprise social network (such as YAMMER™), such that only a recipient called "John Doe" can view Tim Black's posts (e.g., original data). According to aspects discussed herein, generally, if John Doe is also a CBSS user and authorized (e.g., depending on their roles within an organization) to access the cryptographic communication from Tim Black, then John Doe will be able to review the original data transmitted by Tim Black. However, persons who are neither CBSS users, nor are authorized to access the cryptographic communication from Tim Black, generally will not be able to review the original data transmitted by Tim Black (and, such data will appear encrypted or in ciphertext, as illustrated in FIG. 12C).

In one aspect, a "CBSS On" button (shown in region 1202 of screenshot 1200A) reveals that an instance of the CBSS client module (e.g., as a software plugin) is running on the sender's computing device. The sender begins by entering original data (e.g., "I hope you're getting hungry . . . haha") inside text box 1204A, and then clicking on the "Comment CBSS" button. In one embodiment of the CBSS, the client module modifies native buttons, boxes, and other user-interface controls/features of the third party application software program. In other words, without an instance of the CBSS client module running on a user's computing device, the "CBSS On" and "Comment CBSS" buttons may not have been present. In other embodiments, a user does not have the option of toggling on or off the CBSS (e.g., in an enterprise setting within an organization). In yet further embodiments, the individual buttons, fields, etc. are not modified to reflect whether or not the CBSS is on or off; rather, there is simply a mechanism to turn on or off the CBSS via a global setting/switch.

After the sender clicks on the "Comment CBSS" button, the detection engine process (e.g., refer FIG. 5) detects and diverts the original data from passing on to "Eyetext", and also stores the original data in volatile (or, non-volatile) memory in the sender's computing device. Next, the endpoint engine process (e.g., refer FIG. 6) retrieves the original data, encrypts and saves the encrypted output in a device database in the user's computing device. The encrypted output is retrieved by the reinsertion engine process (e.g., refer FIG. 7), processed to correspond to an appearance and format as expected by a respective application program and reinserted in box 1204. An exemplary encrypted output generated as an outcome of CBSS processing on the original data is shown in FIG. 12B. As shown in FIG. 12B, it will be appreciated that the encrypted output generated is in a form un-decipherable to the human eye. After the sender Tim Black clicks on "Comment CBSS" button, the encrypted output is disseminated to other members of the sender's social media network or enterprise social network. Consequently, the encrypted output appears on Tim Black's Eyetext page as displayed exemplarily in FIG. 12C, e.g., see region 1204.

Referring to FIG. 13, a screenshot of an exemplary CBSS embodiment in connection with reception of the cryptographic communication integrated with an exemplary third party application software program called "Eyetext" is shown, from a recipient's perspective, after reception of a cryptographic communication. In other words, users who are members of the sender's social media network or enterprise social network, and are CBSS users and also authorized to access the sender's communication will generally be able to review the cryptographic communication as displayed in screenshot 1300. For example, John Doe who is a CBSS user (box 1302) is generally able to review the original data sent by Tim Black in the form of a cryptographic communication as shown in box 1304 in FIG. 13. (Refer to FIGS. 12A, 12B, and 12C for the cryptographic communication from sender Tim Black's perspective). It will be appreciated that persons who are neither CBSS users, nor are authorized to access the cryptographic communication from Tim Black, generally will not be able to review the original data transmitted by Tim Black (e.g., Tim Black's Eyetext page will display to these users similarly to the screen shots shown in FIG. 12C). Specifically, to those users that are either not authorized to see Tim Black's communications, or that do not have an embodiment of the CBSS operating on their respective computing devices, the original data will appear in an encrypted form. Thus, in an embodiment wherein such persons are also members of Eyetext the cryptographic communication will appear as an encrypted output, e.g., as shown in box 1204 in FIG. 12C.

It will be generally understood that the screenshots provided herein are for illustrative purposes only. Embodiments of the present CBSS have broader applicability in that such embodiments can be integrated with any third party application software program. In other words, embodiments of the CBSS are agnostic of the user's application software (e.g., web browser, email software, document software, spreadsheet software, multimedia software, etc.), the operating system/platform on which the program is operating, or even the user's computing device.

Although not shown in the screenshots provided herein, it will be understood that CBSS embodiments enable role based access control in various scenarios wherein role based access control is applicable. In corporate organizations, for example, multiple policies can be granularly defined and ordered according to a predetermined sequence so that one policy has higher priority over other policies. In such a case, a policy that has a higher priority will be first executed by the CBSS, before a policy having a lower priority is executed. As will be understood and appreciated, the priority or hierarchy of policies may be dictated by CBSS users, system administrators, third party IT security personnel, or preconfigured within the CBSS, etc. As will be further understood by a person skilled in the art, this ranking mechanism could automatically render a policy that has a lower priority as being inoperative.

As described in detail above, aspects of the present disclosure generally relate to systems and methods for encrypting or otherwise securing data. According to one embodiment, the information security is accomplished using context-based encryption keys. Usually, such information to be secured arises from user interactions with software and/or hardware components included in a user's computing device. Generally, the data is secured both while stored inside a user's computing device and/or enterprise data storage system, or when electronically communicated to other person(s) or systems. Examples of data that may be secured/encrypted include (but are not limited to) audio files, video files, data files, system files, image files, or any form of digital data comprising emails, electronic documents, online messages, social media posts, web-based forms, etc., or any variant, sub-part, portion, or combination thereof. Generally, the data to be secured is generated by or associated with a user's entry or input with any kind of application programs and/or hardware across a variety of computing devices.

As has been described in detail above, aspects of the disclosed system, referred to herein as a Context-Based Security System (CBSS), include a client-server architecture comprising proprietary client software installed in user computing devices and proprietary server software installed in a server computer operated by an entity that utilizes the disclosed system. In one aspect, the client software probes hardware and software associated with user computing devices in order to extract original data arising out of a user's interaction with a computing device (or application or platform operating on said computing device), thereby temporarily diverting the flow of original data directed towards an expecting application program running on the user's computing device. As will be understood, the present disclosure does not impose any limitations on the type or other specifics of application programs operating on user computing devices. Generally, examples of application programs include (but are not limited to) word processing software, spreadsheet software, database software, multimedia software, presentation software, education software, simulation software, content access software, social media software, game software, or any other type of generic or special-purpose software. It will be further appreciated that aspects of the present disclosure also provide information security to software elements associated with various technologies such as OLE (Object Linking and Embedding) and other similar technologies.

According to an aspect of the present disclosure, original data is encrypted or secured using a key created by an embodiment of the CBSS. According to yet another aspect, the key created by the CBSS is context-based and unique for every piece (instance) of data that is encrypted. For example, a context-based key might depend on environmental conditions associated with the context of the data, e.g., time instant at which the data is created, application program associated with the data, a unique user identifier, and other conditions. As will be described in greater detail in the discussions that follow, the result of encryption of the original data is referred to herein as the "encrypted version of the original data." In one embodiment, the encrypted version of the original data undergoes further processing and encryption, and is then referred to as "encrypted output." In one exemplary scenario involving "at-rest encryption", the encrypted output is stored in the user's computing device. Alternately, in scenarios wherein secure cryptographic communication is desirable, the encrypted output is shared by a sender with one or more other users (recipients). It will be understood that in many scenarios, such cryptographic communication can include one or more third party systems, providers, or services (e.g., social media systems, online bulletin boards, group email servers, etc.). Generally speaking, encryption is performed by inputting the original data and the key into a cryptographic algorithm such as (but not limited to) Advanced Encryption Standard (AES).

According to an exemplary CBSS aspect, functionalities of the server computer include management of encryption keys, including generation of context-based encryption keys when requested by CBSS clients (e.g., end user devices). Generally, such keys are stored inside exemplary CBSS databases (e.g., on the server computer) and provided to CBSS clients during a subsequent decryption process running in user computing devices. As will be understood, the disclosed CBSS allows the same data (e.g., a single document being utilized by several different members within an organization) originating from different CBSS clients to be secured with different encryption keys.

Furthermore, according to yet other aspects of the present disclosure, the server computer manages the rights of individual users who are able to send and/or access data according to pre-defined policies and/or roles. As will be understood by one skilled in the art, pre-defined policies roles ensure that only authorized users (e.g., depending on their roles within an organization) are able to access certain data and resources. For example, in an enterprise or corporate organization, an IT manager might be able to review any data associated with the enterprise and also change data access permissions of all employees; a director might access all data but not change access permissions; a departmental head might change permissions only for employees working in a department; a low-level employee may have very limited access to data, etc.

Accordingly, it will be understood that various embodiments of the present system described herein are generally implemented as a special purpose or general-purpose computer including various computer hardware as discussed in greater detail below. Embodiments within the scope of the present invention also include computer-readable media for carrying or having computer-executable instructions or data structures stored thereon. Such computer-readable media can be any available media which can be accessed by a general purpose or special purpose computer, or downloadable through communication networks. By way of example, and not limitation, such computer-readable media can comprise physical storage media such as RAM, ROM, flash memory, EEPROM, CD-ROM, DVD, or other optical disk storage, magnetic disk storage or other magnetic storage devices, any type of removable non-volatile memories such as secure digital (SD), flash memory, memory stick etc., or any other medium which can be used to carry or store computer program code in the form of computer-executable instructions or data structures and which can be accessed by a general purpose or special purpose computer, or a mobile device.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the invention may be implemented. Although not required, the inventions are described in the general context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, objects, components, data structures, etc. that perform particular tasks or implement particular abstract data types, within the computer. Computer-executable instructions, associated data structures, and program modules represent examples of the program code for executing steps of the methods disclosed herein. The particular sequence of such executable instructions or associated data structures represent examples of corresponding acts for implementing the functions described in such steps.

Additionally, those skilled in the art will also appreciate that the invention may be practiced in network computing environments with many types of computer system configurations, including personal computers, hand-held devices, multi-processor systems, microprocessor-based or programmable consumer electronics, networked PCs, minicomputers, mainframe computers, and the like. The invention is practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the inventions, which is not illustrated, includes a general purpose computing device in the form of a conventional computer, including a processing unit, a system memory, and a system bus that couples various system components including the system memory to the processing unit. The computer will typically include one or more magnetic hard disk drives (also called "data stores" or "data storage" or other names) for reading from and writing to. The drives and their associated computer-readable media provide nonvolatile storage of computer-executable instructions, data structures, program modules, and other data for the computer. Although the exemplary environment described herein employs a magnetic hard disk, a removable magnetic disk, removable optical disks, other types of computer readable media for storing data can be used, including magnetic cassettes, flash memory cards, digital video disks (DVDs), Bernoulli cartridges, RAMs, ROMs, and the like.

Computer program code that implements most of the functionality described herein typically comprises one or more program modules may be stored on the hard disk or other storage medium. This program code, as is known to those skilled in the art, usually includes an operating system, one or more application programs, other program modules, and program data. A user may enter commands and information into the computer through keyboard, pointing device, a script containing computer program code written in a scripting language or other input devices (not shown), such as a microphone, etc. These and other input devices are often connected to the processing unit through known electrical, optical, or wireless connections.

The main computer that effects many aspects of the inventions will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the inventions are embodied. The logical connections between computers include a local area network (LAN), a wide area network (WAN), and wireless LANs (WLAN) that are presented here by way of example and not limitation. Such networking environments are commonplace in office-wide or enterprise-wide computer networks, intranets and the Internet.

When used in a LAN or WLAN networking environment, the main computer system implementing aspects of the invention is connected to the local network through a network interface or adapter. When used in a WAN or WLAN networking environment, the computer may include a modem, a wireless link, or other means for establishing communications over the wide area network, such as the Internet. In a networked environment, program modules depicted relative to the computer, or portions thereof, may be stored in a remote memory storage device. It will be appreciated that the network connections described or shown are exemplary and other means of establishing communications over wide area networks or the Internet may be used.

In view of the foregoing detailed description of preferred embodiments of the present invention, it readily will be understood by those persons skilled in the art that the present invention is susceptible to broad utility and application. While various aspects have been described in the context of a preferred embodiment, additional aspects, features, and methodologies of the present invention will be readily discernable from the description herein, by those of ordinary skill in the art. Many embodiments and adaptations of the present invention other than those herein described, as well as many variations, modifications, and equivalent arrangements and methodologies, will be apparent from or reasonably suggested by the present invention and the foregoing description thereof, without departing from the substance or scope of the present invention. Furthermore, any sequence (s) and/or temporal order of steps of various processes described and claimed herein are those considered to be the best mode contemplated for carrying out the present invention. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the present inventions. In addition, some steps may be carried out simultaneously.

Accordingly, while the present invention has been described herein in detail in relation to preferred embodiments, it is to be understood that this disclosure is only illustrative and exemplary of the present invention and is made merely for purposes of providing a full and enabling disclosure of the invention. The foregoing disclosure is not intended nor is to be construed to limit the present invention or otherwise to exclude any such other embodiments, adaptations, variations, modifications and equivalent arrangements, the present invention being limited only by the claims appended hereto and the equivalents thereof.

What is claimed is:

1. A method for managing encryption of data associated with one or more application programs operating on one or more electronic computing devices, comprising the steps of:
   receiving at a centralized server module a request for encryption of an item of original data from a particular client module operating on a particular electronic computing device, wherein the request for encryption includes contextual information relating to creation of the item of original data;
   extracting the contextual information from the request for encryption;
   generating via the centralized server module a context-based key (CBK) and a context-based key identifier (CBK ID) based on the contextual information for use in encrypting the item of original data, wherein the CBK ID comprises at least a portion of the contextual information and the CBK is generated by processing the CBK ID through a cryptographic algorithm; and transmitting the CBK and the CBK ID from the centralized server module to the particular client module operating on the particular electronic computing device for use in encryption of the item of original data.

2. The method of claim 1, wherein the CBK ID partially comprises prior-used CBK IDs.

3. The method of claim 1, wherein the CBK is generated by extracting a predetermined number of bits from an output of the cryptographic algorithm.

4. The method of claim 1, wherein the CBK and CBK ID are used for a subsequent auditing function.

5. The method of claim 1, further comprising the step of authenticating the credentials of the request for encryption.

6. The method of claim 1, further comprising the step of retrieving one or more predefined access control policies relating to the contextual information prior to generating the CBK and CBK ID.

7. The method of claim 6, further comprising the step of generating the CBK and CBK ID only upon determining that the predefined access control policies are satisfied.

8. The method of claim 6, wherein the predefined access control policies govern rights of users in regards to decrypting the encrypted output of the item of original data.

9. The method of claim 6, further comprising the step of upon determining that the predefined access control policies are not satisfied, transmitting an alert message to the particular client module operating on the particular electronic computing device.

10. The method of claim 1, wherein the request for encryption received at the centralized server module is transmitted through a secure communication protocol.

* * * * *